(12) United States Patent
Chastain et al.

(10) Patent No.: US 10,104,093 B2
(45) Date of Patent: *Oct. 16, 2018

(54) APPARATUS AND METHOD FOR SECURELY MANAGING THE ACCESSIBILITY TO CONTENT AND APPLICATIONS

(71) Applicant: AT&T Intellectual Property I, L.P., Atlanta, GA (US)

(72) Inventors: Walter Cooper Chastain, Atlanta, GA (US); Stephen Emille Chin, Marietta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/721,128

(22) Filed: Sep. 29, 2017

(65) Prior Publication Data

US 2018/0054448 A1  Feb. 22, 2018

Related U.S. Application Data

(63) Continuation of application No. 14/962,481, filed on Dec. 8, 2015, now Pat. No. 9,813,428, which is a
(Continued)

(51) Int. Cl.
*H04L 29/06* (2006.01)
*H04W 12/06* (2009.01)
*H04W 12/08* (2009.01)

(52) U.S. Cl.
CPC .......... *H04L 63/123* (2013.01); *H04L 63/083* (2013.01); *H04L 63/0869* (2013.01);
(Continued)

(58) Field of Classification Search
None
See application file for complete search history.

(56) References Cited

U.S. PATENT DOCUMENTS

| 5,530,757 | A | 6/1996 | Krawczyk |
| 5,742,910 | A | 4/1998 | Gallant et al. |

(Continued)

FOREIGN PATENT DOCUMENTS

| AU | 2010315111 A1 | 6/2012 |
| CA | 2823685 A1 | 2/2012 |

(Continued)

OTHER PUBLICATIONS

"Over-The-Air Platform Security Review", Mandiant Intelligent Information Security, 6 pgs., Aug. 17, 2010.
(Continued)

*Primary Examiner* — Maung T Lwin
(74) *Attorney, Agent, or Firm* — Guntin & Gust, PLC; Jay H. Anderson

(57) ABSTRACT

A system that incorporates the subject disclosure may perform, for example, receive secret information and non-secret information from a secure download application function, provide a request for a first verification to a secure element where the first verification is associated with access to content and/or an application that is accessible via the secure download application function, receive the first verification which is generated by the secure element based on the secret information without providing the secret information to the secure device processor, receive the non-secret information from the secure element, and generate a second verification for the access based on the non-secret information, where the content and/or application is accessible from the secure download application function responsive to the first and second verifications. Other embodiments are disclosed.

20 Claims, 12 Drawing Sheets

Related U.S. Application Data continuation of application No. 14/065,010, filed on Oct. 28, 2013, now Pat. No. 9,240,994.

(52) U.S. Cl.
CPC ........... *H04L 63/108* (2013.01); *H04W 12/06* (2013.01); *H04W 12/08* (2013.01)

(56) References Cited

U.S. PATENT DOCUMENTS

| | | | |
|---|---|---|---|
| 5,774,544 | A | 6/1998 | Lee et al. |
| 6,005,942 | A | 12/1999 | Chan et al. |
| 6,014,561 | A | 1/2000 | Moelne |
| 6,151,677 | A | 11/2000 | Walter et al. |
| 6,892,301 | B1 | 5/2005 | Hansmann et al. |
| 6,922,200 | B1 | 7/2005 | Marques |
| 7,165,173 | B1 | 1/2007 | Herle |
| 7,171,460 | B2 * | 1/2007 | Kalavade .............. G06Q 20/14 709/223 |
| 7,185,362 | B2 | 2/2007 | Hawkes et al. |
| 7,239,704 | B1 | 7/2007 | Maillard et al. |
| 7,257,844 | B2 | 8/2007 | Woodward et al. |
| 7,269,732 | B2 | 9/2007 | Kilian-Kehr |
| 7,382,881 | B2 | 6/2008 | Uusitalo et al. |
| 7,454,233 | B2 | 11/2008 | Lu et al. |
| 7,472,123 | B2 | 12/2008 | Hamatsu |
| 7,480,907 | B1 | 1/2009 | Marolia et al. |
| 7,486,810 | B1 | 2/2009 | Accapadi et al. |
| 7,499,960 | B2 | 3/2009 | Dageville et al. |
| 7,606,560 | B2 | 10/2009 | Labrou et al. |
| 7,668,315 | B2 * | 2/2010 | Quick, Jr. ............. H04L 9/3271 380/264 |
| 7,715,823 | B2 | 5/2010 | Bravo et al. |
| 7,751,567 | B2 | 7/2010 | Quick, Jr. et al. |
| 7,917,751 | B2 | 3/2011 | Keohane et al. |
| 8,027,472 | B2 | 9/2011 | Aissi et al. |
| 8,032,756 | B2 | 10/2011 | Inami |
| 8,055,910 | B2 | 11/2011 | Kocher et al. |
| 8,064,598 | B2 | 11/2011 | Vaha-Sipila et al. |
| 8,098,818 | B2 | 1/2012 | Grilli et al. |
| 8,165,635 | B2 | 4/2012 | Khan et al. |
| 8,166,524 | B2 | 4/2012 | Sentinelli |
| 8,213,612 | B2 | 7/2012 | Kaabouch et al. |
| 8,244,181 | B2 | 8/2012 | Shuo |
| 8,271,025 | B2 | 9/2012 | Brisebois et al. |
| 8,333,321 | B2 | 12/2012 | Gressel et al. |
| 8,346,287 | B2 | 1/2013 | King et al. |
| 8,380,171 | B2 | 2/2013 | Link et al. |
| 8,387,119 | B2 | 2/2013 | Patel et al. |
| 8,391,837 | B2 | 3/2013 | Corda |
| 8,406,758 | B2 | 3/2013 | Snijder et al. |
| 8,417,952 | B2 | 4/2013 | Cheng et al. |
| 8,494,908 | B2 | 7/2013 | Herwig et al. |
| 8,503,376 | B2 | 8/2013 | Cha et al. |
| 8,505,085 | B2 | 8/2013 | Logan et al. |
| 8,510,559 | B2 | 8/2013 | Guccione et al. |
| 8,533,803 | B2 | 9/2013 | Cha et al. |
| 8,738,898 | B2 | 5/2014 | Herwono et al. |
| 8,776,189 | B2 | 7/2014 | Jain |
| 8,799,451 | B2 | 8/2014 | Raleigh |
| 8,799,932 | B2 | 8/2014 | Prevost et al. |
| 8,814,051 | B2 | 8/2014 | Millet et al. |
| 8,837,449 | B2 | 9/2014 | Chen et al. |
| 9,130,972 | B2 | 9/2015 | Barkan et al. |
| 9,301,145 | B2 | 3/2016 | Merrien et al. |
| 9,442,833 | B1 | 9/2016 | Johansson et al. |
| 2001/0029581 | A1 | 10/2001 | Knauft et al. |
| 2002/0003892 | A1 | 1/2002 | Iwanaga et al. |
| 2002/0040936 | A1 | 4/2002 | Wentker et al. |
| 2002/0174071 | A1 | 11/2002 | Boudou et al. |
| 2002/0188855 | A1 | 12/2002 | Nakayama et al. |
| 2003/0129965 | A1 | 7/2003 | Siegel |
| 2003/0186722 | A1 | 10/2003 | Weiner |
| 2004/0240671 | A1 | 12/2004 | Hu et al. |
| 2005/0002407 | A1 | 1/2005 | Shaheen et al. |
| 2005/0202803 | A1 | 9/2005 | Mahalal |
| 2005/0278787 | A1 | 12/2005 | Naslund et al. |
| 2006/0079284 | A1 | 4/2006 | Lu et al. |
| 2006/0130128 | A1 | 6/2006 | Gorancic et al. |
| 2006/0165060 | A1 | 7/2006 | Dua |
| 2006/0205387 | A1 | 9/2006 | Laitinen et al. |
| 2006/0206710 | A1 | 9/2006 | Gehrmann |
| 2006/0242064 | A1 | 10/2006 | Jogand-Coulomb et al. |
| 2006/0269061 | A1 | 11/2006 | Balasubramanian et al. |
| 2006/0289659 | A1 | 12/2006 | Mizushima et al. |
| 2007/0050365 | A1 | 3/2007 | Laitinen et al. |
| 2007/0101122 | A1 | 5/2007 | Guo |
| 2007/0239857 | A1 | 10/2007 | Mahalal et al. |
| 2007/0294744 | A1 | 12/2007 | Alessio et al. |
| 2008/0005559 | A1 | 1/2008 | Johnson |
| 2008/0010470 | A1 | 1/2008 | McKeon et al. |
| 2008/0155257 | A1 | 6/2008 | Werner et al. |
| 2008/0194296 | A1 | 8/2008 | Roundtree et al. |
| 2008/0276090 | A1 | 11/2008 | Merrien et al. |
| 2008/0301433 | A1 | 12/2008 | Vito |
| 2008/0304458 | A1 | 12/2008 | Aghvami et al. |
| 2009/0077643 | A1 | 3/2009 | Schmidt et al. |
| 2009/0116642 | A1 | 5/2009 | Yang |
| 2009/0163235 | A1 | 6/2009 | Michaels et al. |
| 2009/0191857 | A1 * | 7/2009 | Horn .................... H04W 4/70 455/419 |
| 2009/0220091 | A1 | 9/2009 | Howard |
| 2009/0288012 | A1 | 11/2009 | Hertel et al. |
| 2009/0291712 | A1 | 11/2009 | Park et al. |
| 2009/0313472 | A1 | 12/2009 | Guccione et al. |
| 2009/0327138 | A1 | 12/2009 | Mardani et al. |
| 2010/0037230 | A1 | 2/2010 | Potonniee et al. |
| 2010/0048169 | A1 | 2/2010 | Yan et al. |
| 2010/0062808 | A1 | 3/2010 | Cha et al. |
| 2010/0185874 | A1 | 7/2010 | Robles et al. |
| 2010/0281251 | A1 | 11/2010 | Arauz Rosado |
| 2010/0299731 | A1 | 11/2010 | Atkinson |
| 2010/0306531 | A1 | 12/2010 | Nahari |
| 2010/0315346 | A1 | 12/2010 | Lindroos et al. |
| 2011/0007899 | A1 | 1/2011 | Park et al. |
| 2011/0029779 | A1 * | 2/2011 | Sekiya .................. G06F 21/72 713/176 |
| 2011/0035584 | A1 | 2/2011 | Meyerstein et al. |
| 2011/0093913 | A1 | 4/2011 | Wohlert et al. |
| 2011/0191597 | A1 | 8/2011 | Grall et al. |
| 2011/0208600 | A1 | 8/2011 | Aharoni et al. |
| 2011/0211699 | A1 | 9/2011 | Ma et al. |
| 2011/0265159 | A1 | 10/2011 | Ronda et al. |
| 2011/0269423 | A1 | 11/2011 | Schell et al. |
| 2011/0275364 | A1 | 11/2011 | Austin et al. |
| 2011/0296182 | A1 | 12/2011 | Jia et al. |
| 2011/0302017 | A1 | 12/2011 | Marti et al. |
| 2011/0302408 | A1 | 12/2011 | McDermott et al. |
| 2011/0306318 | A1 * | 12/2011 | Rodgers ................ H04W 8/183 455/410 |
| 2012/0027209 | A1 | 2/2012 | Aissi et al. |
| 2012/0028609 | A1 | 2/2012 | Hruska |
| 2012/0036042 | A1 | 2/2012 | Graylin et al. |
| 2012/0047563 | A1 | 2/2012 | Wheeler et al. |
| 2012/0066504 | A1 | 3/2012 | Hird et al. |
| 2012/0072979 | A1 | 3/2012 | Cha et al. |
| 2012/0096513 | A1 | 4/2012 | Raleigh et al. |
| 2012/0102557 | A1 | 4/2012 | Felton et al. |
| 2012/0108205 | A1 | 5/2012 | Schell et al. |
| 2012/0108213 | A1 | 5/2012 | Kasargod et al. |
| 2012/0130838 | A1 | 5/2012 | Koh et al. |
| 2012/0142332 | A1 | 6/2012 | Li |
| 2012/0144201 | A1 | 6/2012 | Anantha et al. |
| 2012/0159105 | A1 | 6/2012 | von Behren et al. |
| 2012/0159163 | A1 | 6/2012 | von Behren et al. |
| 2012/0172089 | A1 | 7/2012 | Bae et al. |
| 2012/0185661 | A1 | 7/2012 | Desai et al. |
| 2012/0187184 | A1 | 7/2012 | Challa et al. |
| 2012/0190354 | A1 | 7/2012 | Merrien et al. |
| 2012/0208597 | A1 | 8/2012 | Billman |
| 2012/0226582 | A1 * | 9/2012 | Hammad ............... G06F 21/34 705/26.41 |

(56) References Cited

U.S. PATENT DOCUMENTS

| | | |
|---|---|---|
| 2012/0231844 A1 | 9/2012 | Coppinger et al. |
| 2012/0233685 A1 | 9/2012 | Palanigounder et al. |
| 2012/0246476 A1 | 9/2012 | Zhuang et al. |
| 2012/0259849 A1 | 10/2012 | Deodhar et al. |
| 2012/0266220 A1 | 10/2012 | Brudnicki et al. |
| 2012/0311563 A1 | 12/2012 | Lee et al. |
| 2012/0317261 A1 | 12/2012 | Ahmavaara et al. |
| 2013/0012168 A1 | 1/2013 | Rajadurai et al. |
| 2013/0023235 A1 | 1/2013 | Fan et al. |
| 2013/0024383 A1 | 1/2013 | Kannappan et al. |
| 2013/0041830 A1 | 2/2013 | Singh et al. |
| 2013/0067232 A1 | 3/2013 | Cheung et al. |
| 2013/0074163 A1 | 3/2013 | Murakami et al. |
| 2013/0145455 A1 | 6/2013 | Vijayshankar et al. |
| 2013/0152208 A1 | 6/2013 | King et al. |
| 2013/0166595 A1 | 6/2013 | Meketa et al. |
| 2013/0173759 A1 | 7/2013 | Herse et al. |
| 2013/0203465 A1 | 8/2013 | Ali et al. |
| 2013/0262317 A1 | 10/2013 | Collinge et al. |
| 2013/0272714 A1 | 10/2013 | Ohkubo |
| 2013/0291084 A1 | 10/2013 | Amiel et al. |
| 2013/0329683 A1 | 12/2013 | Gachon et al. |
| 2013/0333015 A1 | 12/2013 | Reynolds et al. |
| 2013/0344857 A1 | 12/2013 | Berionne et al. |
| 2014/0013406 A1 | 1/2014 | Tremlet et al. |
| 2014/0018041 A1 | 1/2014 | Summerer et al. |
| 2014/0045462 A1 | 2/2014 | Warnez |
| 2014/0057680 A1 | 2/2014 | Proust et al. |
| 2014/0066019 A1 | 3/2014 | Waters et al. |
| 2014/0073375 A1 | 3/2014 | Li et al. |
| 2014/0189880 A1 | 7/2014 | Funk et al. |
| 2014/0215589 A1 | 7/2014 | Dietrich et al. |
| 2014/0243022 A1 | 8/2014 | L'Heriteau et al. |
| 2014/0281498 A1 | 9/2014 | Bransom et al. |
| 2014/0317686 A1 | 10/2014 | Vetillard et al. |
| 2014/0337234 A1 | 11/2014 | Brewer et al. |
| 2014/0373117 A1 | 12/2014 | Le Saint |
| 2015/0017910 A1 | 1/2015 | Li |
| 2015/0249658 A1 | 9/2015 | Lee et al. |
| 2016/0006762 A1 | 1/2016 | Dumoulin et al. |
| 2016/0182512 A1 | 6/2016 | Chastain et al. |
| 2016/0323111 A1 | 11/2016 | Chastain et al. |
| 2016/0323255 A1 | 11/2016 | Chastain et al. |
| 2016/0381555 A1 | 12/2016 | Chastain et al. |
| 2017/0118185 A1 | 4/2017 | Chastain et al. |
| 2017/0180366 A1 | 6/2017 | Chastain et al. |
| 2017/0295158 A1 | 10/2017 | Chastain |

FOREIGN PATENT DOCUMENTS

| | | |
|---|---|---|
| EP | 1257922 B1 | 6/2006 |
| EP | 1865437 A2 | 12/2007 |
| EP | 1480476 B1 | 10/2008 |
| EP | 2041913 A1 | 4/2009 |
| EP | 2113856 A1 | 11/2009 |
| EP | 2223252 A1 | 9/2010 |
| KR | 2013027097 | 3/2013 |
| WO | 2002063517 | 8/2002 |
| WO | 03046719 A2 | 6/2003 |
| WO | WO2003046719 | 6/2003 |
| WO | 2007079636 A1 | 7/2007 |
| WO | WO2007079636 | 7/2007 |
| WO | 2008059353 A1 | 5/2008 |
| WO | 2008149196 A1 | 12/2008 |
| WO | WO2009/046400 | 4/2009 |
| WO | WO2011/115407 | 9/2011 |
| WO | WO2010051715 | 5/2012 |
| WO | 2012110880 A1 | 8/2012 |
| WO | 2012151571 A2 | 11/2012 |
| WO | 2013006116 A2 | 1/2013 |
| WO | 2013/036009 | 3/2013 |
| WO | 2013/050296 | 11/2013 |

OTHER PUBLICATIONS

"The OTA Platform in the World of LTE", 14 pgs., Jan. 2011.

"3rd Generation Partnership Project; Technical Specification Group Core Network and Terminals; Characteristics of the Universal Subscriber Identity Module (USIM) application", Release 11, 2012.

"3rd Generation Partnership Project; Technical Specification Group Core Network and Terminals; Remote APDU Structure for (U)SIM Toolkit applications", Release 10, 2012.

"3rd Generation Partnership Project; Technical Specification Group Core Network and Terminals; Secured packet structure for (Universal) Subscriber Identity Module (U)SIM Toolkit applications", Release 10, 2012.

"3rd Generation Partnership Project; Technical Specification Group Core Network and Terminals; UICC-terminal interface; Physical and logical characteristics", Release 10, 2011.

"3rd Generation Partnership Project; Technical Specification Group Core Network and Terminals; Universal Subscriber Identity Module (USIM) Application Toolkit (USAT)", Release 11, 2012.

"GlobalPlatform Card Confidential Card Content Management Card Specification v2.2—Amendment A", 2011.

"GlobalPlatform Card Contactless Services Card Specification v2.2—Amendment C", 2012.

"GlobalPlatform Card Remote Application Management over HTTP Card Specification v2.2—Amendment B", 2012.

"GlobalPlatform Card Security Upgrade for Card Content Management Card Specification v 2.2—Amendment E", 2011.

"GlobalPlatform Card Specification", Version 2.2.1, 2011.

"GlobalPlatform Card Technology Secure Channel Protocol 03 Card Specification v 2.2—Amendment D", 2009.

"GlobalPlatform Device Secure Element Remote Application Management", May 2011.

"GlobalPlatform Device Technology Secure Element Access Control", Version 1.0, May 2012.

"GlobalPlatform Device Technology TEE System Architecture", Dec. 2011.

"GlobalPlatform Key Management System", Functional Requirements, Nov. 2003.

"GlobalPlatform System Messaging Specification for Management of Mobile-NFC Services", Feb. 2011.

"Reprogrammable SIMs: Technology, Evolution and Implications", csmg, Sep. 25, 2012.

"Reprogrammable SIMs: Technology, Evolution and Implications Final Report", CSMG-Global, Sep. 25, 2012, 1-95.

"Secure Authentication for Mobile Internet Services", Sim Alliance, http://simalliance.org/wp-content/uploads/2015/03/12-01-01-WP_SIMallianceSecureAuthentication-EN-V1.1.pdf, Dec. 2011, 1-23.

"Smart Cards; Card Application Tookit (CAT)", Release 11, 2012.

"Smart Cards; ETSI numbering system for telecommunication application providers", Release 11, 2011.

"Smart Cards; Machine to Machine UICC; Physical and logical characteristics", Release 9, 2011.

"Smart Cards; Remote APDU structure for UICC based applications", Release 11, 2012.

"Smart Cards; Secured packet structure for UICC based applications", Release 11, 2012.

"Smart Cards; Security mechanisms for UICC based Applications—Functional requirements", Release 8, 2008.

"Smart Cards; UICC Application Programming Interface (UICC API) for Java Card™", Release 9, 2012.

"Smart Cards; UICC-Terminal Interface; Physical and logical characteristics", Release 10, 2011, 179 pages.

"Universal Mobile Telecommunications System (UMTS); UICC-terminal interface; Physical and logical characteristics", Release 10, 2011.

Chen, "An efficient end-to-end security mechanism for IP multimedia subsystem", Computer Communications, 2008, vol. 31.18, pp. 4259-4268.

Dodson, Ben et al., "Snap2Pass: Consumer-Friendly Challenge-Response Authentication with a Phone", http://prpl.stanford.edu/papers/soups10j.pdf, Apr. 30, 2010.

Farhat, Farshid et al., "Private Identification, Authentication and Key Agreement Protocol with Security Mode Setup", Iran Telecommunication Research Center, https://eprint.iacr.org/2011/045.pdf, Apr. 2011, 21 pages.

(56) References Cited

OTHER PUBLICATIONS

Global Platform, "Secure Element Remote Application Management", Version 1.0, May 2011.
Imhontu, et al., "A survey on near field communication in mobile phones & PDAs", Dissertation Halmstad University, 2010. http://hh.diva-portal.org/smash/get/diva2:385433/FULLTEXT01.
Kim, Jong-Min et al., "A Study of Coupons issuance System Considering of User Convenience Based on NFC", 3rd International Conference on Computer Science and Information Technology (ICCSIT'2013) Jan. 4-5, 2013 Bali (Indonesia). http://psrcentre.org/images/extraimages/113118.pdf.
Kounelis, Ioannis et al., "Secure Middleware for Mobile Phones and UICC Applications", Mobile Wireless Middleware, Operating Systems, and Applications, Springer Berlin Heidelberg, 2012, 143-152.
Kounelis, Ioannis et al., "Security of service requests for cloud based m-commerce", MIPRO, 2012 Proceedings of the 35th International Convention, IEEE, 2012.
Meyerstein, et al., "Security Aspects of Smart Cards vs. Embedded Security in Machine-to-Machine (M2M) Advanced Mobile Network Applications", InterDigital Communications Corporation LLC, First International ICST Conference: MobiSec 2009, Security and Privacy in Mobile Information and Communication Systems, p. 214-225, Jun. 3-5, 2009.
Nagalakshmi, et al., "Modified Protocols for Internet Key Exchange (IKE) Using Public Encryption and Signature Keys", Information Technology: New Generations (ITNG), 2011 Eighth International Conference on, 2011, pp. 376, 381.
Zhang, et al., "Cryptographic Key Agreement Protocol Simulation", Semantics Knowledge and Grid (SKG), 2010 Sixth International Conference on, 2010, pp. 418, 419.

* cited by examiner

100

200

FIG. 3A
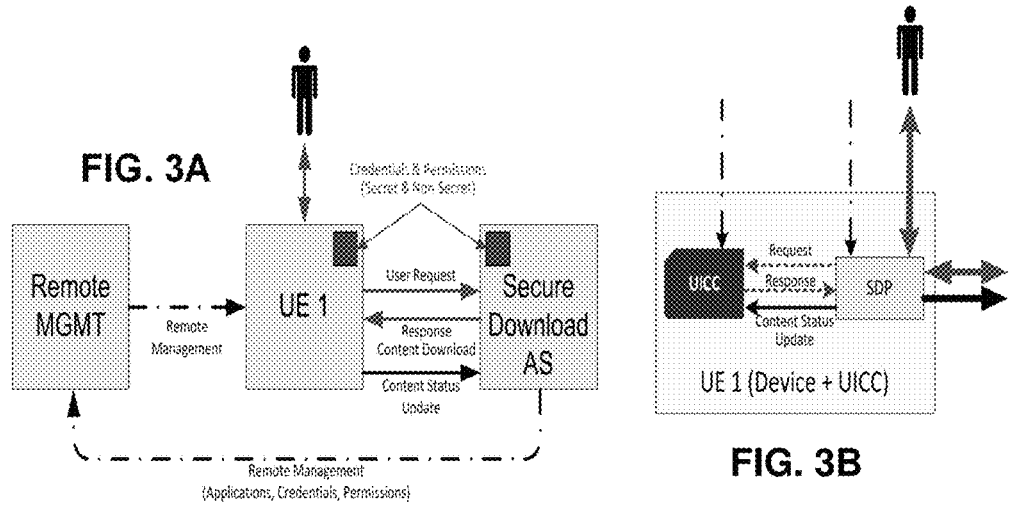
300
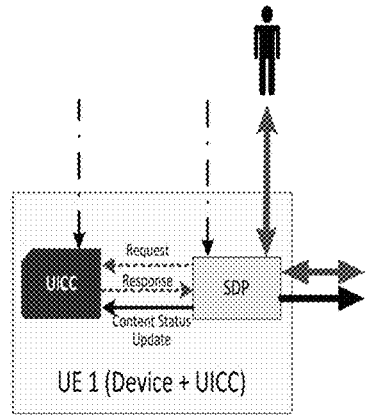
FIG. 3B
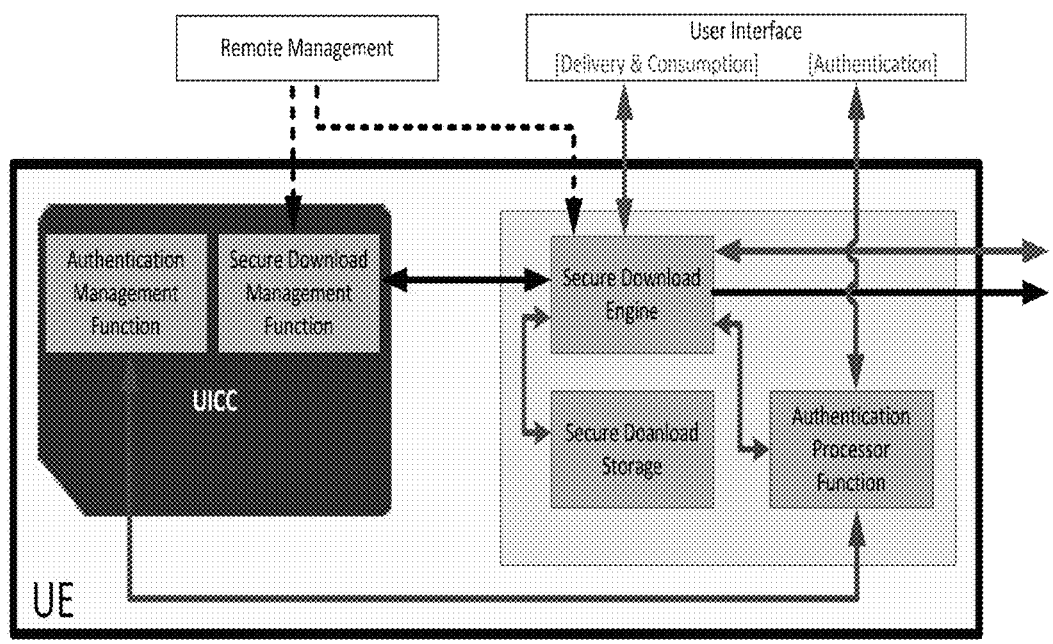
FIG. 3C

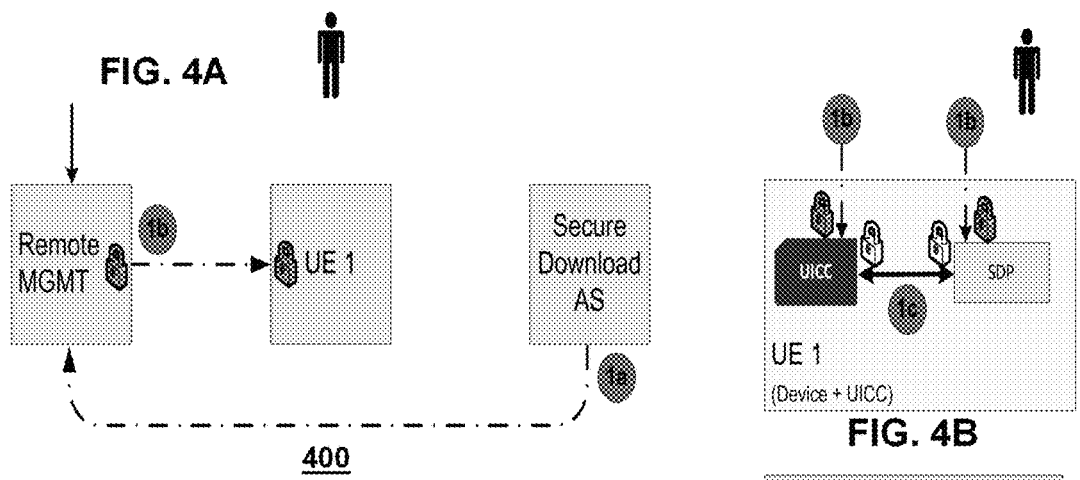
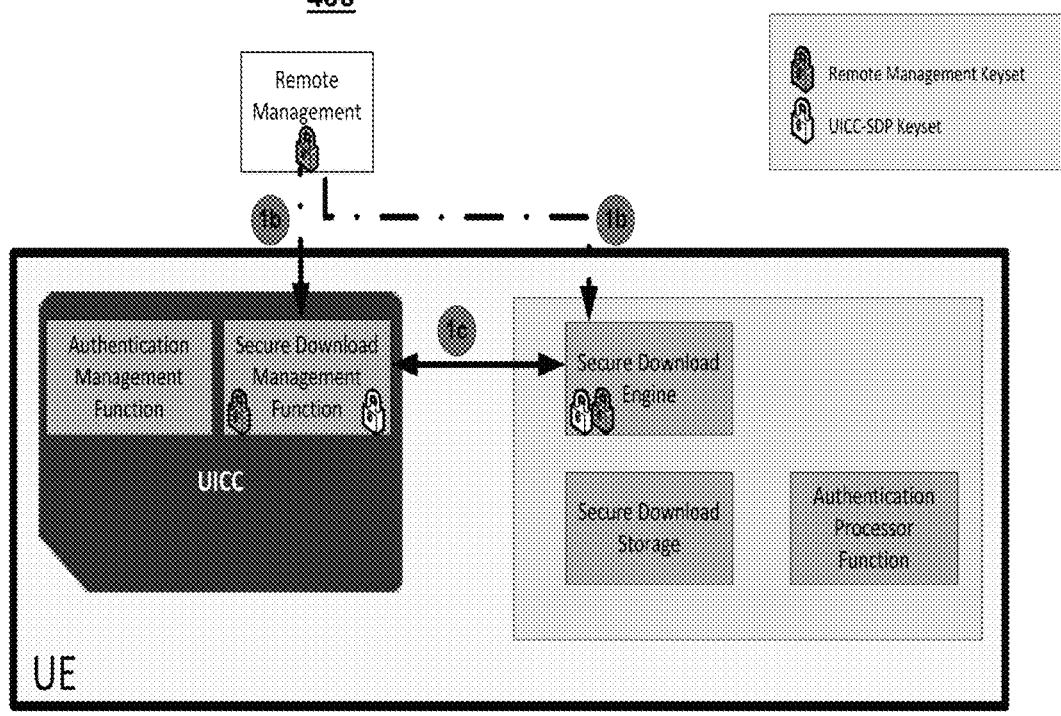
FIG. 4C

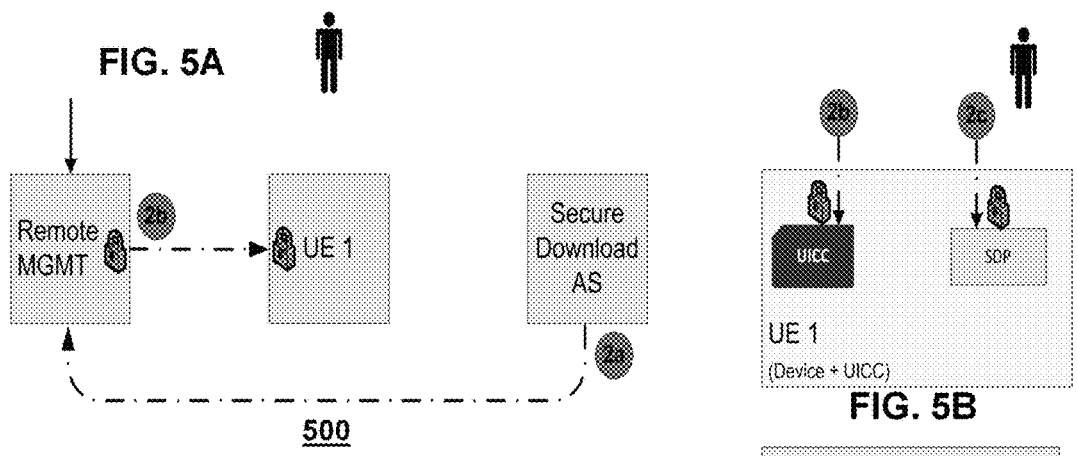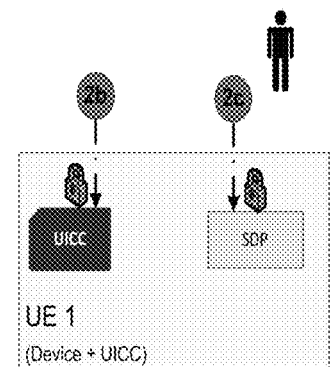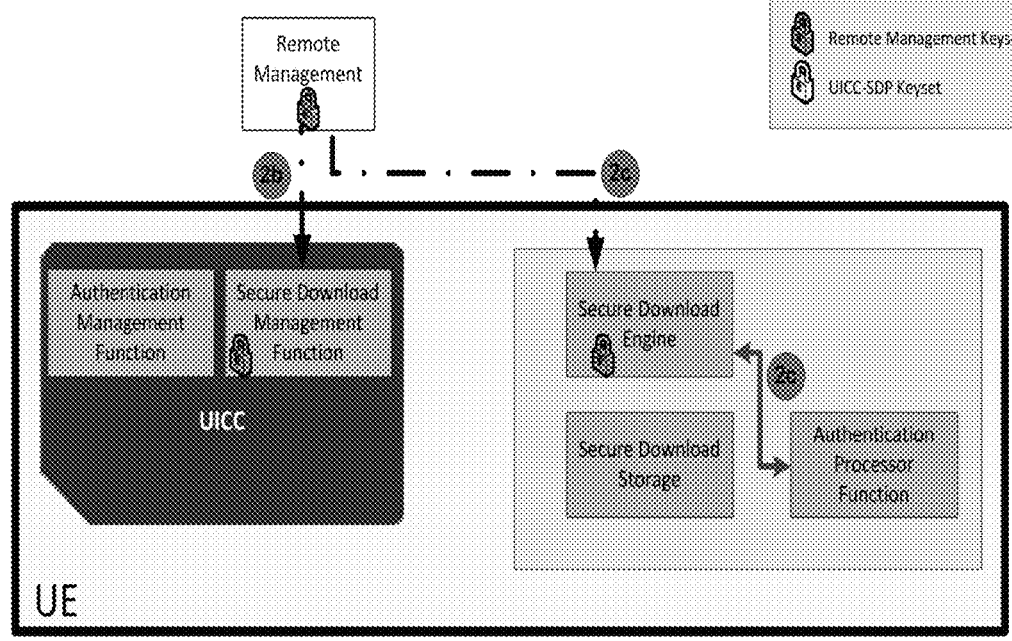
FIG. 5A
FIG. 5B
FIG. 5C

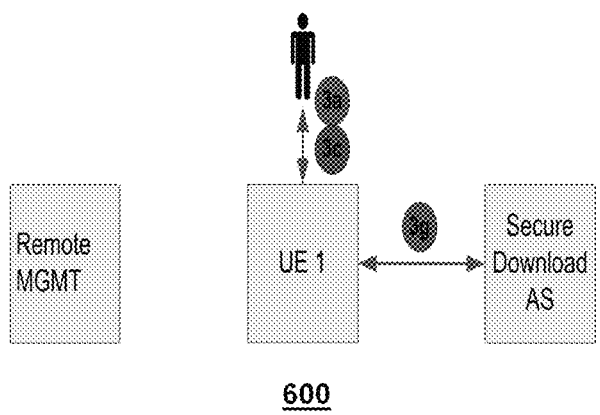
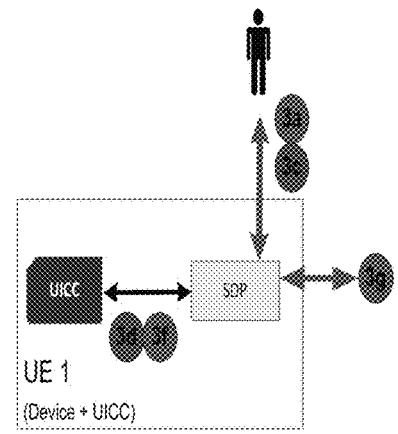
FIG. 6A    FIG. 6B
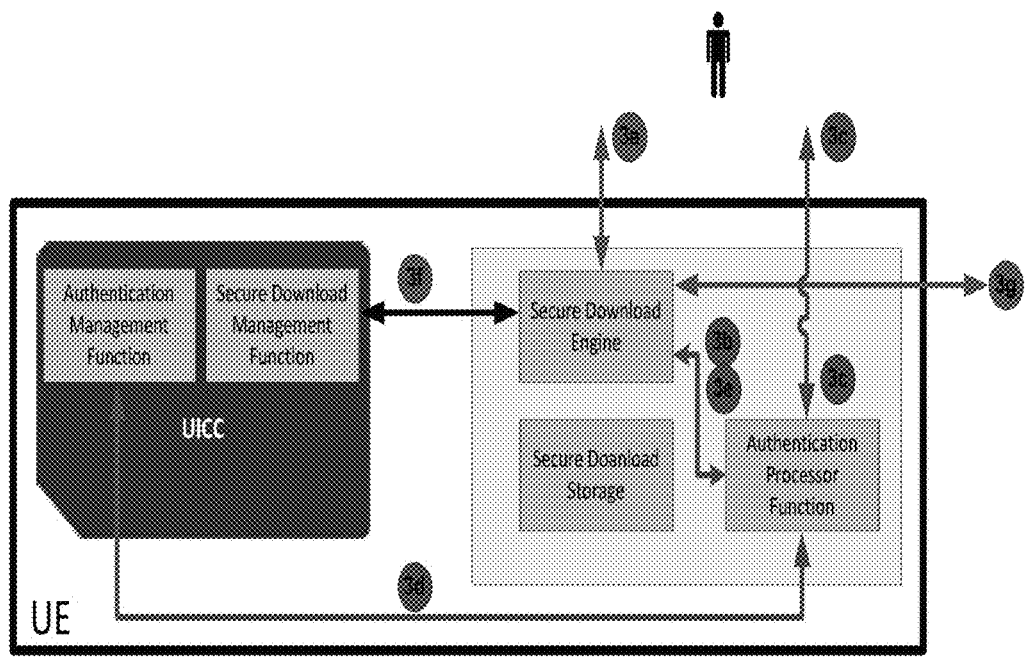
FIG. 6C

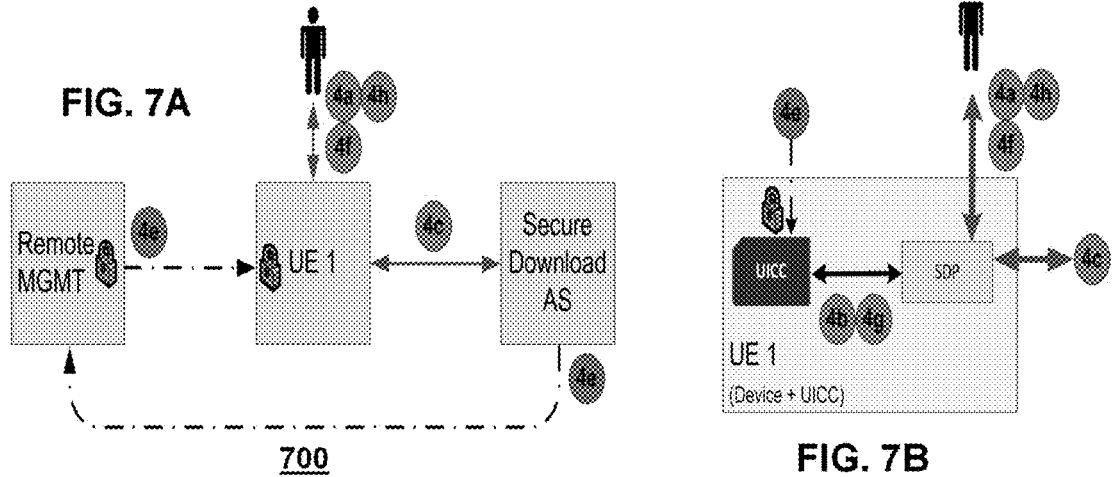
FIG. 7A
FIG. 7B
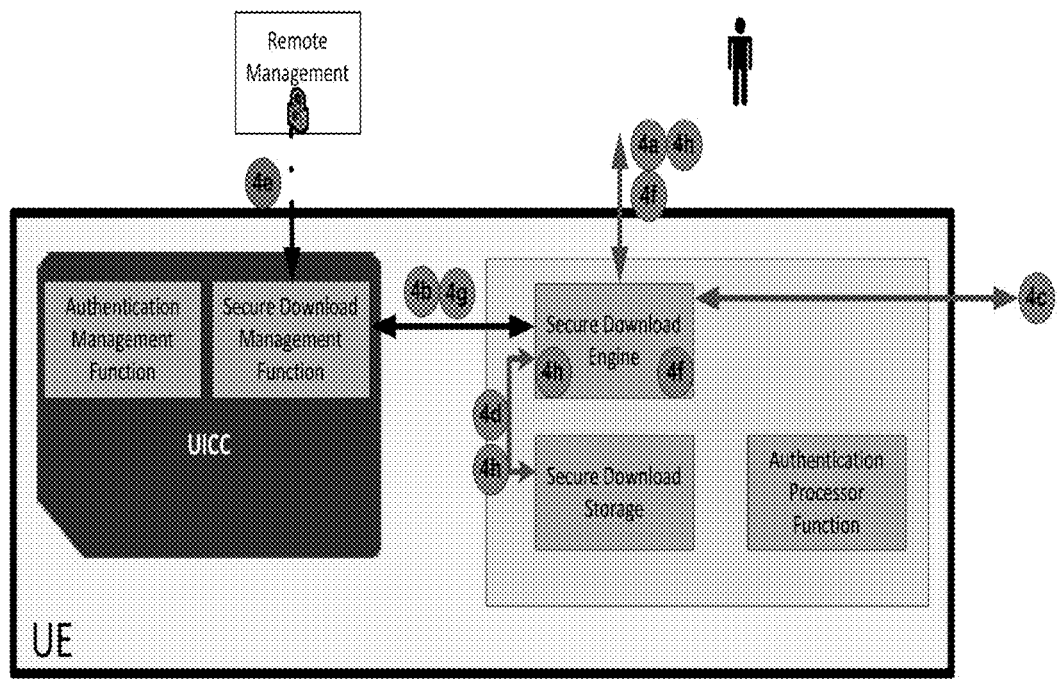
FIG. 7C

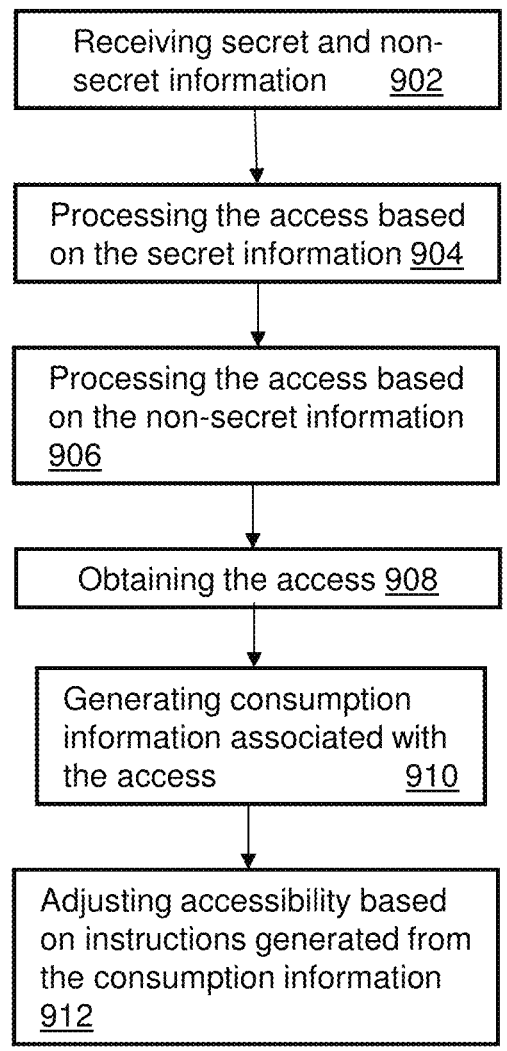

APPARATUS AND METHOD FOR SECURELY MANAGING THE ACCESSIBILITY TO CONTENT AND APPLICATIONS

CROSS-REFERENCE TO RELATED APPLICATIONS

This application is a Continuation of U.S. patent application Ser. No. 14/962,481, filed on Dec. 8, 2015, which is a Continuation of U.S. patent application Ser. No. 14/065,010, filed Oct. 28, 2013. All sections of the aforementioned applications are incorporated herein by reference in their entirety.

FIELD OF THE DISCLOSURE

The subject disclosure relates to an apparatus and method for securely managing the accessibility to content and applications.

BACKGROUND

Electronic devices are being utilized with more frequency to conduct various types of transactions and exchanges of information. Content and applications are available from a wide variety of sources that may or may not be known to the users. The content and applications can include private information or other data that a user and/or a source may desire to maintain as confidential and secure.

BRIEF DESCRIPTION OF THE DRAWINGS

Reference will now be made to the accompanying drawings, which are not necessarily drawn to scale, and wherein:

FIGS. 3A-3C depict an illustrative embodiment of a system that can be used for securely managing content and applications including downloads, storage and consumption;

FIGS. 4A-4C depict an illustrative embodiment of a system that can be used for used for provisioning devices that are engaged in securely managing content and applications;

FIGS. 5A-5C depict an illustrative embodiment of a system that can be used for configuring devices that are engaged in securely managing content and applications;

FIGS. 6A-6C depict an illustrative embodiment of a system that can be used for selection of securely managed content and applications;

FIGS. 7A-7C depict an illustrative embodiment of a system that can be used for consumption of securely managed content and applications;

FIG. 9 depicts an illustrative embodiment of a method used in portions of the systems described in FIGS. 1-8C;

DETAILED DESCRIPTION

Figure 1:
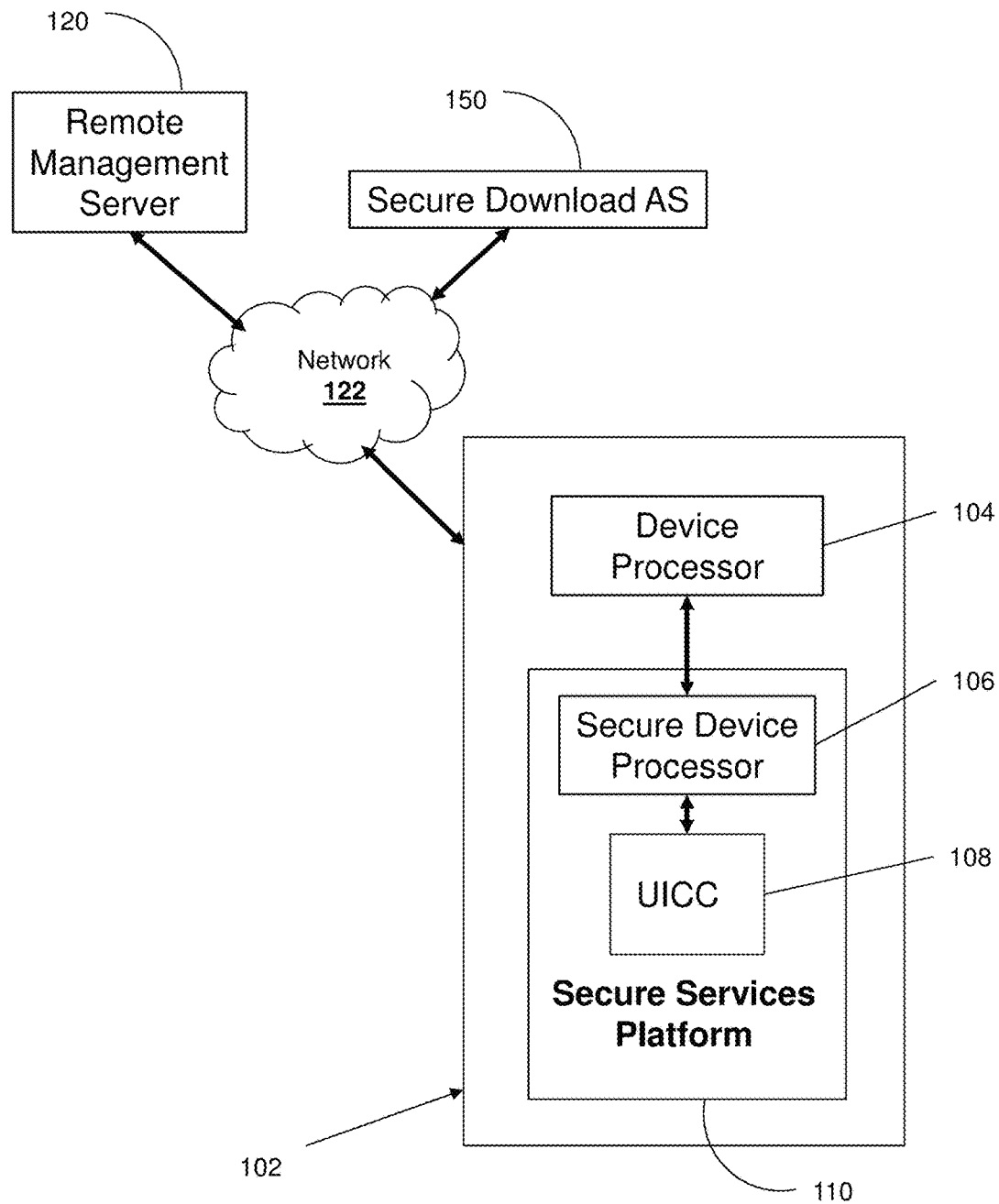
FIG. 1 depicts an illustrative embodiment of a system that enables use of a secure element and a secure device processor as part of a secure services platform for a communication device which provides security for content and application downloads, storage and consumption.

The subject disclosure describes, among other things, illustrative embodiments for securely browsing, downloading, storing, and rendering content and/or applications for consumption or execution within a device (e.g., a smartphone, a desktop computer, a set top box, a tablet, and so forth), such as by using a secure element (e.g., a universal integrated circuit card (UICC)) and a Secure Device Processor (SDP) as a secure download platform. The UICC can be a highly secure computing platform for storing secrets such as encryption keys and authentication credentials. It can be capable of hosting and executing highly secure applets. The SDP can be a processor that is logically and/or physically separate from a device processor and can offer more hardened security than the device processor, but not as much security as the UICC. Examples of an SDP can include a Trusted Execution Environment (TEE) and an embedded Secure Element (eSE). Together, the UICC and SDP can provide a secure means of browsing, downloading, storing, and/or rendering for consumption secure content and/or applications in one or more of the exemplary embodiments. The exemplary embodiments describe accessibility to content and/or applications which can include all types of accessibility, such as browsing, downloading, immediate consumption, later consumption (e.g., from local storage) and so forth.

In one or more embodiments, the secure element (e.g., the UICC) can contain a secure download management function for storing information, such as credentials and permissions, used to access, download, store, and render content and/or applications. Content and/or application data can be downloaded from a secure download application function (e.g., operating on a server which is illustrated as AS in the FIGs.). A secure download engine within the SDP can interacts between the user, the secure download application function, and the secure download management function of the secure element to download and render content and/or application data for consumption, such as based on a set of credentials and permissions stored within the secure download application function and locally within the secure download management function.

In one or more embodiments, these credentials and permissions can include one or more of user identification, device identification, security levels indicating what rights the user has to the content and/or application, digital rights management data, validity times, decryption keys (e.g., for content playback and/or application execution), counters, access codes, and so forth. This information can be categorized or otherwise defined as either being secret or non-secret information. In one embodiment, secret credentials and permissions are not transmitted from the secure download management function and operations involving them take place entirely within the secure download management function. In one embodiment, non-secret credentials and permissions can be passed to the secure download engine of the SDP and/or to other devices, such as the secure download application function.

In one or more embodiments, both the UICC and SDP are utilized together to provide a platform for the secure delivery, management, and consumption of content and/or applications. In one or more embodiments, the SDP can be used to interact with the user, the UICC, and the secure download application function. In one or more embodiments, the SDP can be used to verify file-based credentials and permissions stored in the content and/or applications, and user-based credentials and permissions stored in the UICC for the delivery and consumption of content and/or applications. In one or more embodiments, the SDP can be used to update the secure download application function and the UICC regarding the status of content and/or applications, including whether they have been presented, executed, and so forth. In one or more embodiments, the UICC can be used to store user credentials and permissions. In one or more embodiments, secure remote management of the UICC and SDP applications can be performed. In one or more embodiments, secure remote management of the UICC to update credentials and permissions can be performed utilizing update information. In one or more embodiments, multiple verifications such as by the UICC and the SDP can be utilized for browsing, consuming or both with respect to content and/or applications.

Other embodiments are included in the subject disclosure.

One embodiment of the subject disclosure includes a communication device having a secure element with a secure element memory including first executable instructions. The secure element, responsive to executing the first executable instructions, can perform first operations including receiving secret information and non-secret information from a secure download application function, where the secure download application function is remote from the communication device. The secure element can store the secret information and the non-secret information in the secure element memory. The communication device can also have a secure device processor having a secure device processor memory with second executable instructions. The secure device processor can be separate from the secure element and in communication with the secure element. The secure device processor, responsive to executing the second executable instructions, can perform second operations including providing a request for a first verification to the secure element, where the first verification is associated with access to content that is accessible via the secure download application function. The secure device processor can receive the first verification which is generated by the secure element based on the secret information without providing the secret information to the secure device processor, and can receive the non-secret information from the secure element. The secure device processor can generate a second verification for the access based on the non-secret information, where the content is received from the secure download application function responsive to the first and second verifications.

One embodiment of the subject disclosure is a method including receiving, by a secure element of a communication device, secret information and non-secret information from a secure download application function that is remote from the communication device. The method can include storing the secret information in a secure element memory of the secure element. The method can include providing, by a secure device processor of the communication device, a request for a first verification to the secure element, wherein the secure device processor is separate from the secure element and is in communication with the secure element, and wherein the first verification is associated with access to an application that is accessible via the secure download application function. The method can include receiving, by the secure device processor, the first verification which is generated by the secure element based on the secret information without providing the secret information to the secure device processor. The method can include receiving, by the secure device processor, the non-secret information from the secure element. The method can include generating a second verification for the access based on the non-secret information, where the application is accessible by the communication device from the secure download application function responsive to the first and second verifications.

One embodiment of the subject disclosure is a method including providing, by a secure download application function via a remote management server, secret information and non-secret information to a secure element of a communication device, wherein the secure download application function and the remote management server are remote from the communication device, and wherein the secret information is configured for storage at the secure element without permitting access to the secret information by a secure device processor of the communication device. The method can include receiving, at the secure download application function, an access request from the secure device processor for at least one of content or an application, wherein the access request is generated at the communication device according to a first verification by the secure element based on the secret information and according to a second verification by the secure device processor based on the non-secret information. The method can include providing, over a download path by the secure download application function, the at least one of the content or the application to the communication device responsive to the access request, wherein the download path does not include the remote management server.

In accordance with an embodiment of the disclosure, FIG. 1 depicts a system 100 that includes a communication device 102 connected to or otherwise in communication with a network 122 and provided with a secure services platform 110 enabling authentication of other communication devices and encrypted communication with those devices. It will be appreciated that the communication device 102 may be any device, including a user device, which has a secure element and a secure device processor. The term "user," in this example, refers to a human user of the communication device. However, in other embodiments, the user can be a machine that exchanges data with the communication device 102 after being authenticated to the communication device. Communication device 102 can include a device processor 104, a SDP 106 and a secure element 108. In this embodiment, secure element 108 can be a UICC. The UICC can be a secure computing platform and can offer a high level of security for storing encryption keys, authentication credentials, and the like. The UICC may be removable from the device. In other embodiments, the UICC may be embedded in the device and not removable. In other embodiments, the secure element 108 can be placed on a memory card or an embedded chip. The SDP 106 can be logically and/or physically separate from the device processor 104, and can be connected to both the device processor and the UICC 108. In this embodiment, the SDP 106 can offer a higher level of security than the device processor 104, and can store and execute secure applications. The SDP 106 can, for example, run applications in a trusted execution environment. The secure element 108 and SDP 106 together can form a secure services platform 110 resident on the device 102. In this embodiment, secure element 108, SDP 106 and device processor 104 can each have a security level associated therewith, and the security level associated with the SDP 106 can be intermediate between that of the secure element 108 and that of the device processor 104. The SDP and secure element 108 can use mutual authentication, as described in more detail below.

The secure element 108 and SDP 106 can communicate with a management (function) server 120, located remotely from device 102. The remote management server 120 can be a platform for provisioning and/or managing applications in the secure element 108 and SDP 106. The remote management server 120 can also manage data (such as keys, credentials, and so forth) that are used by the applications. Examples of remote management servers are described in U.S. patent application Ser. No. 13/679,479 filed on Nov. 16, 2012 and U.S. patent application Ser. No. 13/680,680 filed on Nov. 19, 2012, the disclosures of both of which are hereby incorporated by reference.

In this embodiment, user device 102 can be a wireless communication device connected to a cellular network 122. Network 122 can also be other types of networks operating according to various communication protocols, such as a WiFi network. In other embodiments, device 102 can be connected to other devices via a wired connection through a computer. In still other embodiments, user devices can communicate with each other using Bluetooth, infrared communications (IRDa) and/or near field communications (NFC). A communication session between user devices, wherein information is transferred between the users, can be effected by a wide variety of arrangements. A secure application server (SAS) can be used in some embodiments to establish a secure communication session between devices. However, a secure application server may not be used in embodiments where the communication session is established in a peer-to-peer manner, such as in Bluetooth, IRDa or NFC.

System 100 enables content and/or applications to be securely browsed, downloaded, stored, and rendered for consumption within the device 102, such as a smartphone by using the secure element 108 (which may exist within the UICC or in another configuration) and the SDP 106 as a secure platform. The secure element 108 can be a highly secure computing platform for storing secrets, such as encryption keys and authentication credentials. In one or more embodiments, the secure element 108 can host and execute highly secure applets. The device processor 104 can sometimes be relatively unsecure but has the capability of storing and executing very large and processor intensive applications. Examples of the SDP 106 can include a Trusted Execution Environment (TEE) and embedded Secure Element (eSE). Together, the secure element 108 and SDP 106 can provide a secure means of downloading, storing, and consuming content and applications.

In one or more embodiments, system 100 enables loading secure download applications to end user devices; loading initial credentials and permissions to the end user devices; providing user access to browse content and/or applications; managing user requests and consumption of content and/or applications; managing post-consumption notifications; and/or updating credentials and permissions. In one or more embodiments, system 100 provides: a secure download management function that may be located in the UICC; a secure download engine which may be located in the SDP; a master set of credentials and permissions which can be stored in the secure download application function and a subset of which can be stored in the secure download management function of the UICC; a remote management system which can remotely manage the secure download management function and the secure download engine and which can remotely load credentials and permissions into the secure download management function; and/or linkage (e.g., registration to and association) with an authentication function. In one or more embodiments, access requests for content and/or applications can be generated at an end user device, a network element, and/or another device.

Figure 2:
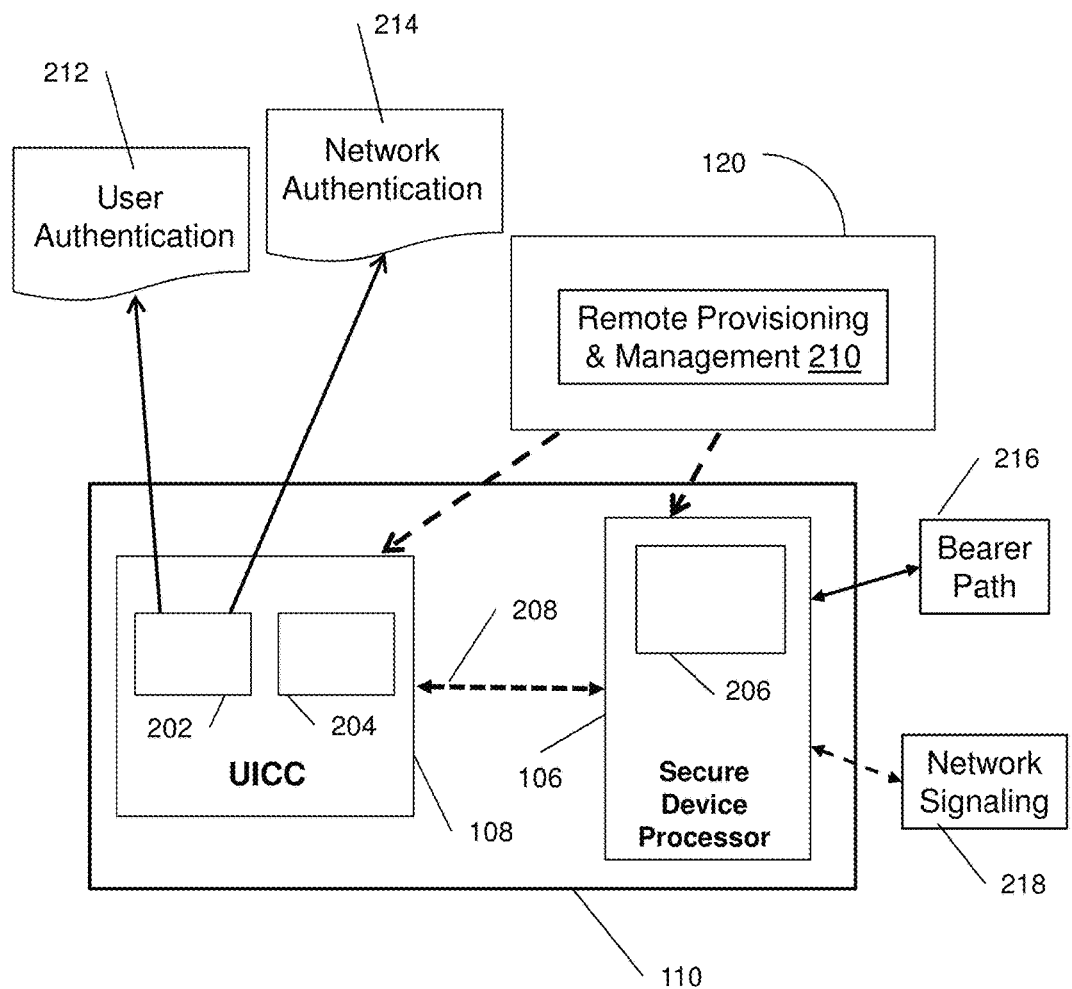
FIG. 2 depicts an illustrative embodiment of a system including the communication device of FIG. 1 implementing authentication and management functions.

FIG. 2 is a schematic illustration 200 showing details of a secure services platform 110, according to an embodiment of the disclosure, which can be used with the communication device 102 of FIG. 1. The secure element 108 (in this embodiment, a UICC) can contain an authentication management function 202 and a real-time encryption key generator 204. The authentication management function 202 can provide authentication services for the device. For example, the authentication management function 202 can support mutual authentication of devices, support a mutual authentication of the device, such as with the remote management server 120 of FIG. 1. As shown in FIG. 2, the authentication management function 202 can include a user authentication service 212 for authenticating the user to the device and a network authentication service 214 for authenticating the device to network equipment. The real-time encryption key generator 204 can supply encryption keys to a real-time encryption engine 206 which is located in the SDP 106. The real-time encryption engine 206 can encrypt and decrypt user information transmitted to or from a bearer path 216 that terminates at another device (e.g., another user device), and may encrypt and decrypt information transmitted on a signaling path 218 to the network. In another embodiment, the encryption engine can be loaded on a second secure element, separate from the secure element 108.

The remote management server 120 can perform a remote provisioning and management function 210 to load applications and/or content into the secure element (e.g., UICC) 108 and SDP 106. In this embodiment, the remote management server 120 can provision the authentication management function 202 and real-time encryption key generator 204 on the UICC 108, and can provision the real-time encryption engine 206 on the SDP 106. This can be done securely by the use of one or more remote management keysets. In one embodiment, before the secure services platform 110 can be used for communication, the SDP 106 can be authenticated by the UICC 108. In one embodiment, this can be done using a UICC-SDP keyset. The UICC-SDP keyset may be provisioned remotely by the remote management server 120 or locally by an authorized user. In this embodiment, after the UICC 108 and SDP 106 are mutually authenticated using the UICC-SDP keyset, they can communicate via a signaling path 208 within the secure services platform 110. The UICC-SDP keyset may be used for secure communication during initial loading and provisioning. However, the keys being utilized may be different. In one embodiment, the path between the UICC 108 and the SDP 106 can go through the device processor 104 rather than directly between the UICC and the SDP.

In this embodiment of FIG. 2, the secure services platform 110 enables receiving secret information and non-secret information from a secure download application function, where the secure download application function is remote from the communication device. The secret information and/or the non-secret information can be stored in a secure element memory. The SDP 106 can provide a request for a first verification to the secure element 108, where the first verification is associated with access to content and/or an application that is accessible via the secure download application function. The SDP 106 can receive the first verification which is generated by the secure element 108 based on the secret information without providing the secret information to the secure device processor. The SDP 106 can receive the non-secret information from the secure element 108. The SDP can generate a second verification for the access based on the non-secret information. The content and/or application can be received or otherwise accessed from the secure download application function responsive to the first and second verifications.

Referring to system 300 of FIGS. 3A-C, secure management of download, storage and/or consumption of content and/or applications is generally illustrated. The secure element 108 can contain the secure download management function which performs one or more of the following tasks: storing credentials and permissions; validating user, device, and network requests based on secret credentials and permissions; and providing non-secret credentials and permissions to the secure download engine.

In one or more embodiments, the SDP 106 can contain the secure download engine which performs one or more of the following tasks: processing user, device, and network requests for content and/or applications; communicating with an authentication function to authenticate the user; communicating with the secure download application function 150 to browse and download content and/or applications; communicating with the secure download management function for the verification of secret credentials and permissions; communicating with the secure download management function to obtain non-secret credentials and permissions; validating user and/network requests based non-secret credentials and permissions; rendering or displaying content and/or applications to the user based on information from the secure download management function and file-based permissions (e.g., at the time of download and/or later to stored content and/or applications); executing downloaded applications based on information from the secure download management function and file-based permissions; decrypting encrypted content and/or application data; updating the secure download management function and secure download application function 150 as to the status of downloaded content and/or application data; and performing operations to stored content and/or application data based on instructions from either or both of the secure download management function and the secure download application function 150. It should be further understood that the verification process described herein based on secret information and/or non-secret information can be utilized at various times including during an initial browsing and/or obtaining of the content and/or applications and then later when stored content and/or applications are to be consumed.

In one or more embodiments, the secure download application function 150 can perform one or more of the following tasks: maintaining user information, including the master set of credentials and permissions; processing requests from the user or network to download content and/or applications; containing secure content and/or application data; verifying that the user has the proper credentials and permissions before allowing access to browse and download content and/or applications; downloading the content and/or application to the user's device; downloading credentials and permissions to the secure download management function through the remote management function (server); and receiving content and/or application status updates from the secure download engine.

In one or more embodiments, the remote management server 120 can create and load the secure download applications described above into both the secure element 108 (e.g., UICC) and the SDP 106. It can also update the credentials and permissions that are stored in the secure download management function (e.g., responsive to consumption of the content/application or prior to the consumption). In one or more embodiments, these operations can be done securely by the use of one or more remote management keysets. For example, the keysets can be used to mutually authenticate the UICC 108 and SDP 106 with the remote management server 120 and to enable encryption between them.

In one or more embodiments, the secure downloading of content and/or applications can be initiated by the user, by the device, and/or by the network. Credentials and permissions for access to content and/or applications can be stored in the secure download application function 150. These credentials and permissions may include one or more of user identification, device identification, security levels indicating what rights the user and/or device has to the content and/or application, validity times, decryption keys (e.g., for content playback and/or application execution), counters, access codes and so forth.

In one or more embodiments, the secure element 108 can exist within the UICC, can store a subset of the credentials and permissions of the secure download application function 150 and/or can provide local policy for the use of stored content and/or application data. Credentials and permissions can be loaded into the secure element 108 from the network using a very high security process, such as based on Global Platform. In one embodiment, this path can be separate and isolated from the path in which the content and/or applications are transported to the device. In one embodiment, secret credentials and permissions never leave the secure element 108, while non-secret credentials and permissions may be provided to the SDP 106 and to the secure download application function 150.

In one or more embodiments, two types of permissions, user/device-based and file-based can be utilized User/device permissions can be stored in the secure download application function 150 along with user/device credentials. A subset of these credentials and permissions can be transmitted to the secure element 108. File permissions can be stored within the files themselves. The authentication function can be used to verify the user with the secure element 108 and then to the secure download application function 150. The SDP 106 can interact with the user, secure element 108, and secure download application function 150 to process user/device/network requests, forward those requests to the secure download application function, and to download, store, and render/execute content and applications to the user or device based on credentials and permissions.

In one or more embodiments, the secure download application function 150 can receive requests for content and/or applications directly from the network. The secure download application function 150 can verify the credentials and permissions stored within it to see if requested content and/or applications can be downloaded to the user/device. The SDP 106 can request that the secure element 108 verify secret credentials and permissions and can verify on its own non-secret credentials and permissions provided to it by the secure element 108. The SDP 106 can display content to the user and can perform actions on applications based on the result of this verification. The SDP 106 can notify the secure element 108 and secure download application function 150 of state changes to stored content and/or application data (e.g., playback, execution of a downloaded executable file, and so forth). The secure element 108 and/or the secure download application function 150 can provide instructions to the SDP 106 for the content and/or applications based on the notifications received. The secure download application function 150 can make changes to the credentials and permissions stored within the secure element 108. Credentials and permissions can be transmitted using a separate path (e.g., via the remote management server 120) from the download of content and/or applications (e.g., bypassing the remote management server 120).

Referring FIGS. 4A-C, system 400 is depicted which illustrates loading of secure download applications. In one embodiment, two applications can be loaded to the end user device: the secure download management function and the secure download engine. For example, if the applications have not been loaded at the time of manufacture, then at 1a, upon receiving a request for the service, the secure download application function 150 can instruct the remote management server 120 to download the secure download management function to the secure element 108 (e.g., UICC) and the secure download engine to the SDP 106.

At 1b, the remote management server 120 can download the secure download management function to the UICC 108 and the secure download engine to the SDP 106. Remote management keysets can be used to securely transmit information from the remote management server 120 to the end user device. This process can involve mutual authentication and encryption. At 1c, the UICC 108 and SDP 106 can mutually authenticate with each other once the two are provisioned using the UICC-SDP Keyset.

Referring to FIGS. 5A-C, system 500 is depicted which illustrates personalizing with initial credentials and permissions. In one or more embodiments, an initial set of user credentials and permissions can be loaded into the secure download management function through the remote management server 120.

At 2a, an initial set of user credentials and permissions as well as instructions can be transmitted from the secure download application function 150 to the remote management server 120. At 2b, the credentials and permissions can be downloaded to the secure download management function using the remote management keyset. At 2c, the remote management server 120 can instruct the secure download engine to register and associate with the authentication processor function. The secure download engine can then register and associate with the authentication processor function.

Referring FIGS. 6A-C, system 600 is depicted which illustrates enabling a user to browse groups of secure content and/or applications. In one or more embodiments, to browse for content and/or applications, the user must first be given access to the secure download application function 150. At 3a, the user can request access to browse content and/or applications. The secure download engine can check to see if the user has been authenticated. At 3b, if the user has not been authenticated, the secure download engine can request the authentication processor function to authenticate the user. At 3c, the authentication processor function can request credentials from the user based on the information provided to it when the secure download engine registered and associated with it. At 3d, the authentication processor function can process the credentials and can transmit them to the authentication management function for user verification.

The authentication management function can verify whether or not the user is authenticated. If the user is verified, the authentication management function can provide access credentials, such as a user ID, for the secure download application function 150 to the authentication processor function. At 3e, the authentication processor function can notify the secure download engine whether or not the user is authenticated. If authenticated, it may also provide access credentials for the secure download application function 150. At 3f, once authenticated, the secure download engine may check for local permissions by asking the secure download management function to determine whether or not the user has permissions that allow access to the secure download application function 150. The secure download management function can respond. At 3g, if the secure download engine receives an affirmative response from the secure download management function, or if it decided not to check the permissions locally, the secure download engine can establish a channel with the secure download application function 150. The secure download application function 150 can verify that the user has permission to access content and/or applications. The user may now browse for content and/or applications.

Referring to FIGS. 7A-C, system 700 is depicted which illustrates enabling user requests and consumption of content and/or applications. In one or more embodiments, this process involves the user selection of content and/or an application to be downloaded, the downloading and storage of the content and/or application load file and data, and the rendering for consumption of the content and/or the execution of the application. Content and/or applications may be downloaded and immediately consumed (e.g. streamed) or executed, or they may be stored for consumption/execution at a different time. In one or more embodiments, the request for content and/or applications may also be initiated by the device, another end user device and/or the network. At 4a, the user can request content and/or an application to be downloaded to the device. The request can indicate if the download is to be immediately consumed or stored for later consumption. At 4b, the secure download engine can check for local permissions by asking the secure download management function to determine whether or not the user has permissions that allow for the delivery of the requested download from the secure download application function 150 based on the request. The secure download management function can respond. In one embodiment, the secure download engine may require the user to authenticate to it such as described above with respect to steps 3b-3e.

At 4c, if the secure download engine receives an affirmative response from the secure download management function, or if it decided not to check the permissions locally, the secure download engine can establish a channel with the secure download application function 150. The secure download application function 150 can verify that the user has permission to download the content and/or application based on the request. The secure download application function 150 can download the content and/or application data to the secure download engine. At 4d, the secure download engine can store the content and/or application data in secure download storage. In one embodiment, secure download storage can be used both to buffer content and/or application data for immediate consumption as well to store content and/or application data for consumption at a later time. The content and/or application may be encrypted. At 4e, the secure download application function 150 can update the credentials and permissions stored within the secure download management function prior to the rendering of the content and/or execution of the application data. The update can be transported from the secure download application function 150 through the remote management server 120 to the UICC 108. The update may include decryption keys in addition to updated credentials and permissions.

At 4f, the secure download engine can initiate rendering of the content and/or the execution of the application load file stored in the secure download storage. This may be initiated by the user or initiated automatically by the secure download engine. The secure download engine can check for file-based permissions within the downloaded files and act upon them if necessary. In one embodiment, the secure download engine may require the user to authenticate to it such as described above in steps 3b-3e. At 4g, if the content and/or application data is encrypted the secure download engine can request a decryption key from the secure download management function. At 4h, content and/or application data can be loaded from the secure download storage to the secure download engine where it is decrypted if necessary, rendered, and displayed to the user for consumption. Applications can be loaded from the secure download storage to the secure download engine, decrypted if necessary, and executed. In one or more embodiments, the secure download engine may check for permissions from the secure download management function before it renders the content and/or executes the application.

Figure 8A:
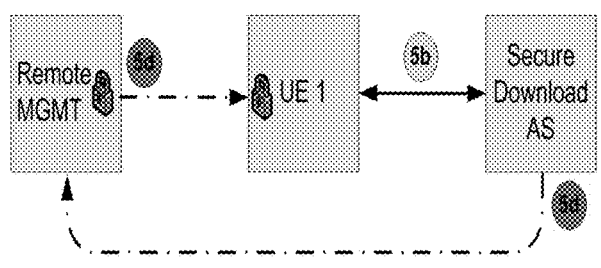
FIGS. 8A-8C depict an illustrative embodiment of a system that can be used for distributing information associated with the consumption of securely managed content and applications.
Figure 8B:
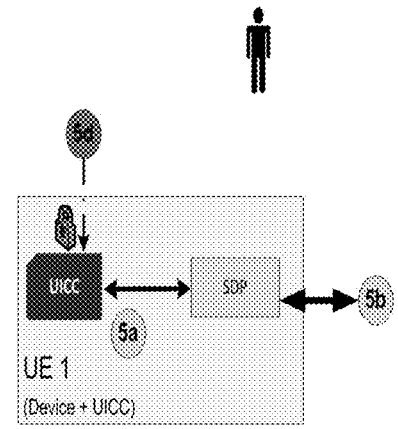
Figure 8C:
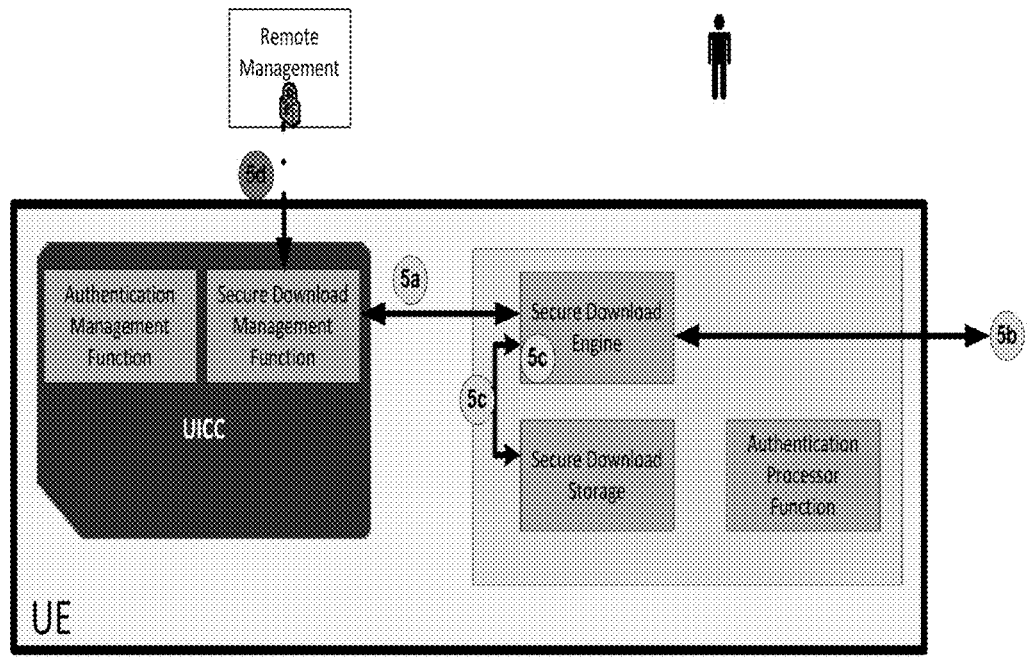

Referring to FIGS. 8A-C, system 800 is depicted which illustrates notification procedures such as post-consumption notices. In one or more embodiments, once the content and/or application data is consumed the secure download engine may notify the secure download management function and/or the secure download application function 150 as to the status of the content and/or application (i.e. if it has just been consumed). The secure download management function or the secure download application function 150 may provide instructions to the secure download engine based on the notification. Credentials and permissions may be updated as a result of the notification.

At 5a, once the content and/or application is consumed, the secure download engine can notify the secure download management function. The secure download management function may provide instructions to the secure download engine regarding the content and/or applications. At 5b, the secure download engine can notify the secure download application function 150 which may also provide instructions to the secure download engine regarding the content and/or applications. In one embodiment, instructions from the secure download application function 150 can take priority over those from the secure download management function. At 5c, the secure download engine can take action according to the instructions it received. These instructions can include locking, deleting or otherwise rendering inaccessible the content and/or application data stored in secure download storage. At 5d, the secure download application function 150 can update the credentials and permissions stored within the secure download management function after the rendering/execution of the content and/or applications. The update can be transported from the secure download application function 150 through the remote management server 120 to the UICC 108.

In one or more embodiments, credentials and permissions can be updated at various times. For example, at any time during the lifecycle of the service, the secure download application function 150 may wish to update the credentials and permissions stored in the secure download management function. This can be facilitated by the remote management server 120 utilizing the technique described above with respect to steps 2a and 2b for the initial personalization.

FIG. 9 depicts an illustrative embodiment of a method for securely managing content and/or applications including download, storage and/or consumption by an end user communication device. Method 900 can begin at 902 where secret information and non-secret information is received by an end user device, such as from a secure download application function 150 that is remote from the communication device. The secret and non-secret information can be received via remote management server 120 at secure element 108 (e.g., a UICC). In one or more embodiments, keysets can be utilized for mutual authentication of the secure element 108 and the secure device processor 106 with the remote management server 120. The secret and non-secret information can be various types of information. For example, the secret information can include a decryption key (e.g., for content playback and/or application execution) and/or an authentication credential. As another example, the non-secret information can include a user identification, a device identification, digital rights management data, and/or a validity time period. In one embodiment, whether the information is secret or non-secret can depend on a number of factors, such as a type of content and/or application being accessed, a subscriber service, quality of service requirements, and so forth. The secret information can be securely stored at a secure element memory so that the secret information is not provided to, or otherwise accessible by, the secure device processor or a device processor of the end user device. In one embodiment, the non-secret information can also be stored at the secure element memory and can be selectively provided to the secure device processor, the device processor, and or other devices (e.g., the secure download application function 150).

At 904, an access request can be processed based on the secret information. The request can be for access to various types of content (e.g., images, video, audio, data, and so forth) and/or access to various types of applications, such as instructions that can be executed by or otherwise utilized by the end user device. The processing at 904 can be in various forms, such as generating a verification that the end user device and/or the user is permitted the desired access. Other processing can also be provided, such as digital rights management and so forth. In one embodiment, the secure device processor 106 can request a verification from the secure element that the access is valid. In response to this request, the secure element 108 can analyze the secret information to make the determination, without providing the secret information to the secure device processor 106. This processing can include decrypting based on a secret decryption key, identifying and verifying access codes, and so forth. Continuing with the example, the secure element can provide the secure device processor 106 with a verification that the access request is valid. In one or more embodiments, all of the secret information is limited to access by the secure element 108 with the secure device processor 106 being prevented from accessing the secret information.

At 906, the secure device processor 106 can perform its own processing of the access request based on the non-secret information. For example, responsive to receiving the access request (e.g., via user input or vie a request from a remote device), the secure device processor 106 can request the non-secret information be provided from the secure element 108. The secure device processor 106 can then analyze the non-secret information to generate a verification of the access request. For instance, the non-secret information can include one or more of a user identification, a device identification, digital rights management data, or a validity time period. The secure device processor 106 can determine that the user is of appropriate age to watch content and/or execute applications based on the user identification, can determine that the device has the capabilities of presenting the content and/or applications based on the device identification, can determine that the content and/or applications is legally accessible based on the digital rights management data and/or can determine that the content and/or applications is still available from the source based on the validity time period.

In one embodiment, the end user device can obtain access to browsing content and/or applications accessible via the secure download application function 150. For example, user credentials can be received at the secure device processor 106 along with user input requesting content and/or applications browsing access. The secure device processor 106 can provide the user credentials to the secure element 108. The secure device processor 106 can receive browsing access credentials from the secure element 108 responsive to an authentication of the user credentials by the secure element. In this example, a browsing channel can be established between the end user device and the secure download application function 150 responsive to the browsing access credentials, where the browsing channel enables browsing a group of content and/or a group of applications accessible via the secure download application function.

At 908, if the processing of the secret information by the secure element 108 and the processing of the non-secret information by the secure device processor 106 verifies that the access request is valid then the secure download application function 150 can provide the end user device with access to the content and/or application. The access can be various types including, browsing, downloading, storage, consumption and so forth. In one embodiment, the end user device can establish different communication paths for receiving the secret/non-secret information and receiving the content/application. For example, the secure element 108 can receive the secret information and the non-secret information from the secure download application function 150 over a communication link that includes the remote management server 120, while the download (or other access) of the content and/or application via the secure download application function is over a communication link that does not include the remote management server 120. In one embodiment, steps 904-908 can be performed multiple times, such as once to browse the content and/or applications, a second time for downloading and storing the content and/or applications, and/or a third time for consuming the content and/or applications.

In one embodiment at 910, consumption information can be generated by the end user device. For example, the end user device can monitor the presentation, execution or change of state of the content and/or application and can generate consumption information based on the monitoring. In one embodiment, the consumption information can be generated by the secure device processor 106 and provide to one or both of the secure element 108 or the secure download application function 150. Continuing with this example, access adjustment instructions can be generated (by either or both of the secure element 108 and the secure download application function 150) and provided to the secure device processor 106 for adjustment of the accessibility of the content and/or application at the end user device at 912. As an example, adjustment instructions can be received by the secure device processor 106 causing it to lock or delete all or a portion of the content and/or application data (e.g., stored in a secure download storage of the secure device processor). Other adjustment instructions can also be received by the secure device processor 106, such as instructions to archive or transmit (e.g., to another device) all or a portion of the content and/or application.

Figure 10:
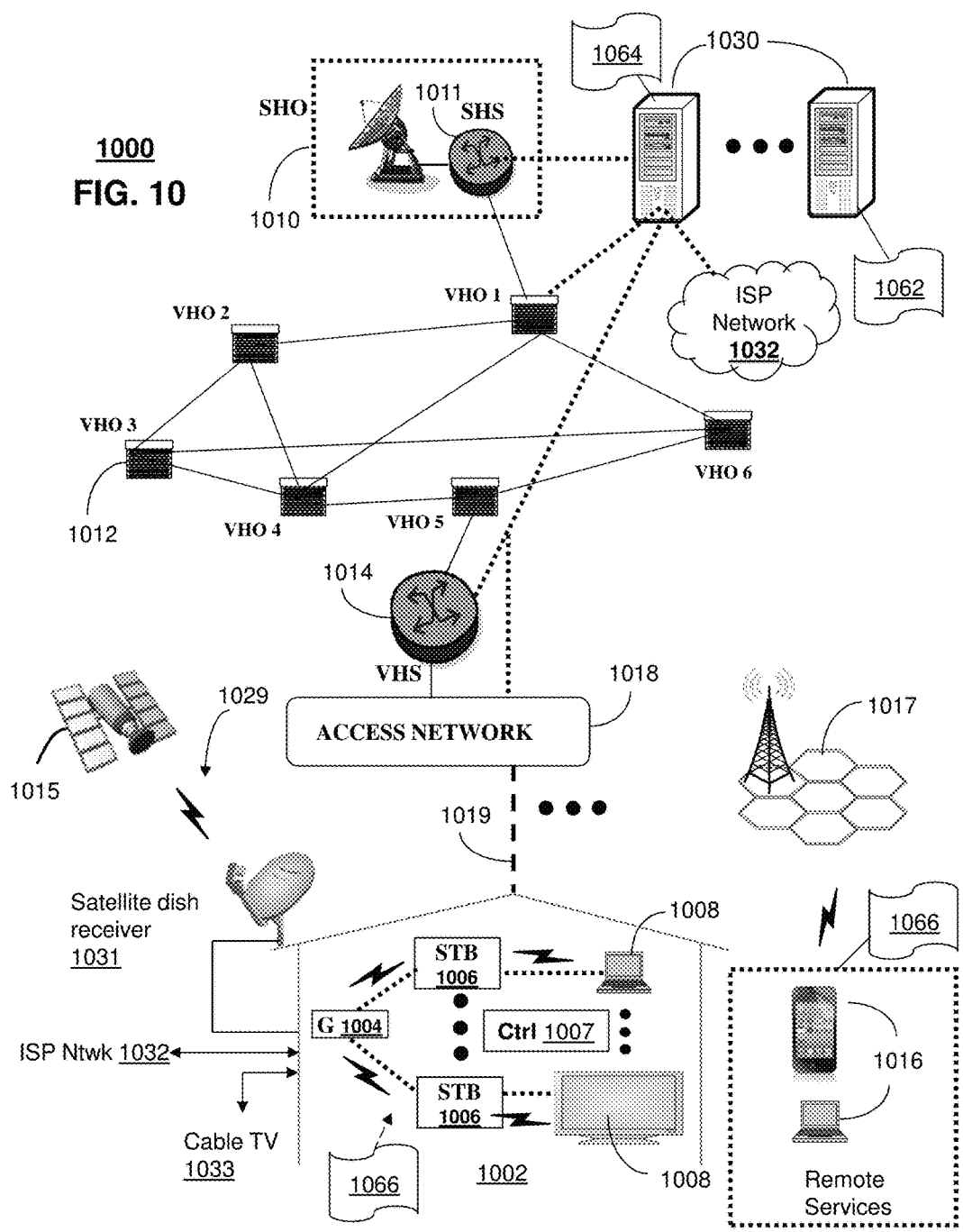
FIG. 10 depicts an illustrative embodiment of a communication system that provides media services including secure management of content and applications.

FIG. 10 depicts an illustrative embodiment of a communication system 1000 for delivering media content and/or applications. The communication system 1000 can represent an Internet Protocol Television (IPTV) media system. Communication system 1000 can be overlaid or operably coupled with systems 100, 200 of FIGS. 1 and 2 as another representative embodiment of communication system 1000. In one or more embodiments, system 1000 enables providing, by a secure download application function via a remote management server, secret information and non-secret information to a secure element of a communication device. The secure download application function and the remote management server can be remote from the communication device, and the secret information can be configured for storage at the secure element without permitting access to the secret information by a secure device processor of the communication device. System 1000 also enables receiving, at the secure download application function, an access request from the secure device processor for at least one of content and/or an application. The access request can be generated at the communication device according to a first verification by the secure element based on the secret information and according to a second verification by the secure device processor based on the non-secret information. System 1000 can provide, over a download path by the secure download application function, the at least one of the content and/or the application to the communication device responsive to the access request. The download path may bypass the remote management server.

The IPTV media system can include a super head-end office (SHO) 1010 with at least one super headend office server (SHS) 1011 which receives media content and/or applications from satellite and/or terrestrial communication systems. In the present context, media content can represent, for example, audio content, moving image content such as 2D or 3D videos, video games, virtual reality content, still image content, and combinations thereof. Applications can represent any software or instructions that are executable by a machine or group of machines to perform operations tasks, or other functions. The SHS server 1011 can forward packets associated with the media content to one or more video head-end servers (VHS) 1014 via a network of video head-end offices (VHO) 1012 according to a multicast communication protocol.

The VHS 1014 can distribute multimedia broadcast content and/or applications via an access network 1018 to commercial and/or residential buildings 1002 housing a gateway 1004 (such as a residential or commercial gateway). The access network 1018 can represent a group of digital subscriber line access multiplexers (DSLAMs) located in a central office or a service area interface that provide broadband services over fiber optical links or copper twisted pairs 1019 to buildings 1002. The gateway 1004 can use communication technology to distribute broadcast signals to media processors 1006 such as Set-Top Boxes (STBs) which in turn present broadcast channels to media devices 1008 such as computers or television sets managed in some instances by a media controller 1007 (such as an infrared or RF remote controller).

The gateway 1004, the media processors 1006, and media devices 1008 can utilize tethered communication technologies (such as coaxial, powerline or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 1006 and subsystems of the IPTV media system for services such as video-on-demand (VoD), browsing an electronic programming guide (EPG), or other infrastructure services.

A satellite broadcast television system 1029 can be used in the media system of FIG. 10. The satellite broadcast television system can be overlaid, operably coupled with, or replace the IPTV system as another representative embodiment of communication system 1000. In this embodiment, signals transmitted by a satellite 1015 that include media content and/or applications can be received by a satellite dish receiver 1031 coupled to the building 1002. Modulated signals received by the satellite dish receiver 1031 can be transferred to the media processors 1006 for demodulating, decoding, encoding, and/or distributing broadcast channels to the media devices 1008. The media processors 1006 can be equipped with a broadband port to an Internet Service Provider (ISP) network 1032 to enable interactive services such as VoD and EPG as described above.

In yet another embodiment, an analog or digital cable broadcast distribution system such as cable TV system 1033 can be overlaid, operably coupled with, or replace the IPTV system and/or the satellite TV system as another representative embodiment of communication system 1000. In this embodiment, the cable TV system 1033 can also provide Internet, telephony, and interactive media services.

The subject disclosure can apply to other present or next generation over-the-air and/or landline media content services system and/or applications distribution system.

Some of the network elements of the IPTV media system can be coupled to one or more computing devices 1030, a portion of which can operate as a web server for providing web portal services over the ISP network 1032 to wireline media devices 1008 or wireless communication devices 1016.

Communication system 1000 can also provide for computing devices 1030 to function as a remote management server and/or a secure download application function (herein referred to as server 1030). The server 1030 can use computing and communication technology to perform function 1062, which can include among other things, maintaining user information, including the master set of credentials and permissions; processing requests from the user or network to download content and/or applications; storing secure content and/or application data; verifying that the user has the proper credentials and permissions before allowing access to browse and download content and/or applications; downloading the content and/or application to the user's device; downloading credentials and permissions to the secure download management function through the remote management server; and/or receiving content and/or application status updates from the secure download engine. The server 1030 can use computing and communication technology to perform function 1064, which can include among other things, creating and loading the secure download applications into both the secure element (e.g., UICC) and the SDP; updating the credentials and permissions that are stored in the secure download management function; and/or utilizing remote management keysets to mutually authenticate the UICC and SDP with the remote management server and to enable encryption between them. The media processors 1006 and wireless communication devices 1016 can be provisioned with software functions 1066, to utilize the services of server 1030. Functions 1066 can include functions being performed at the secure element 108 including storing credentials and permissions; validating user, device, and/or network requests based on secret credentials and permissions; and/or providing non-secret credentials and permissions to the secure download engine. Functions 1066 can also include functions being performed at the secure device processor 106 such as processing user, device, and network requests for content and/or applications, communicating with the authentication function to authenticate the user; communicating with the secure download application function to browse and download content and/or applications; communicating with the secure download management function for the verification of secret credentials and permissions; communicating with the secure download management function to obtain non-secret credentials and permissions; validating user and/or network requests based non-secret credentials and permissions; rendering and displaying content and/or applications to the user based on information from the secure download management function and file-based permissions; executing downloaded applications based on information from the secure download management function and file-based permissions; decrypting encrypted content and/or application data; updating the secure download management function and secure download application function as to the status of downloaded content and/or application data; and/or performing operations to stored content and/or application data based on instructions from either or both of the secure download management function and the secure download application function.

Multiple forms of media services can be offered to media devices over landline technologies such as those described above. Additionally, media services can be offered to media devices by way of a wireless access base station 1017 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 11:
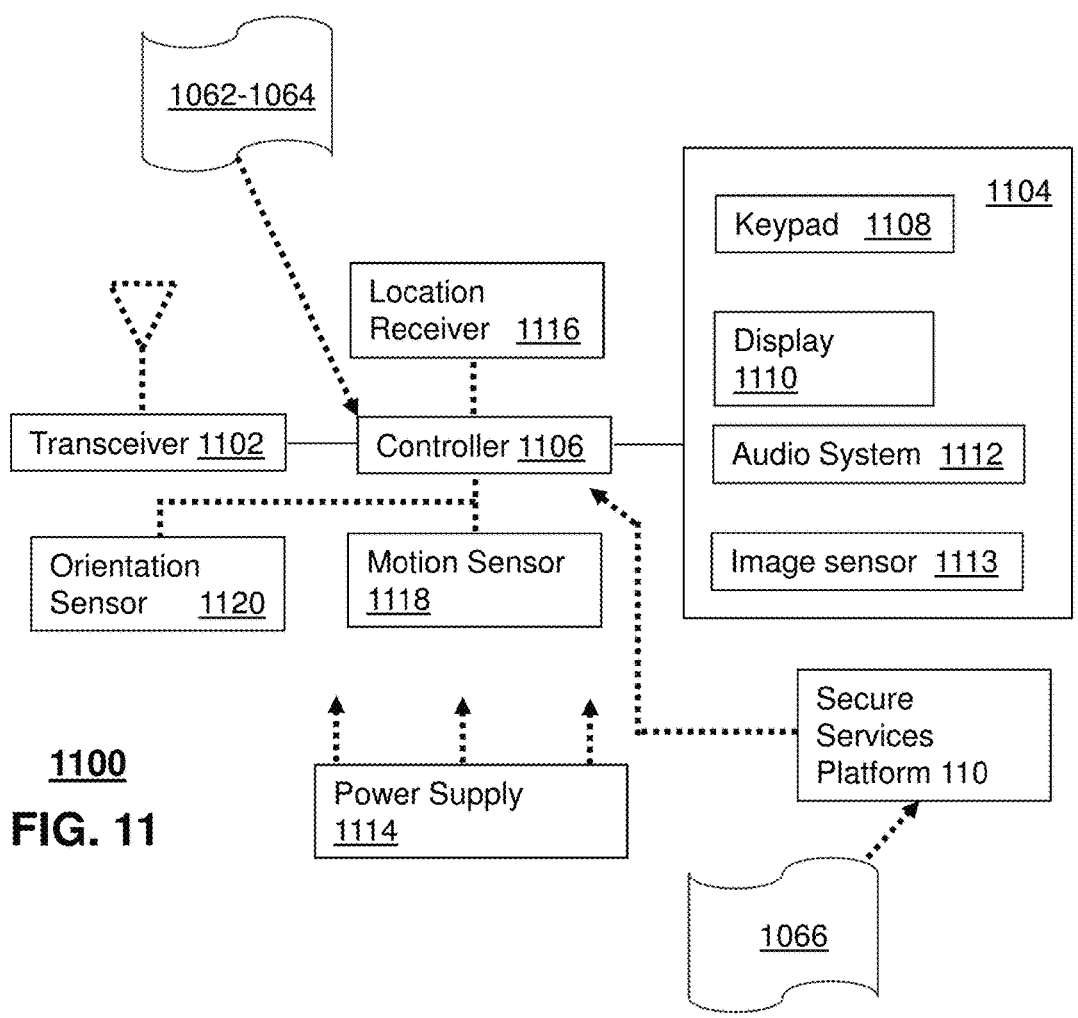
FIG. 11 depicts an illustrative embodiment of a communication device that can download, store and consume securely managed content and applications.

FIG. 11 depicts an illustrative embodiment of a communication device 1100. Communication device 1100 can serve in whole or in part as an illustrative embodiment of the devices depicted in FIGS. 1-8 and 10. For instance, device 1100 can include a secure element and a secure device processor in the secure services platform 110. The secure element 108 can receive secret information and non-secret information from a secure download application function, where the secure download application function is remote from the communication device; and can store the secret information and the non-secret information in the secure element memory. The secure device processor 106 can provide a request for a first verification to the secure element, the first verification being associated with access to content and/or applications that is accessible via the secure download application function; receive the first verification which is generated by the secure element based on the secret information without providing the secret information to the secure device processor; receive the non-secret information from the secure element; and generate a second verification for the access based on the non-secret information.

To enable these features, communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth, ZigBee, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, NFC, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device 1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card which, in some embodiments, can be the secure element or UICC. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of the media processor 1006, the media devices 1008, or the portable communication devices 1016 of FIG. 10. It will be appreciated that the communication device 1100 can also represent other devices that can operate in communication system 1000 of FIG. 10, such as a gaming console and a media player.

The communication device 1100 shown in FIG. 11 or portions thereof can serve as a representation of one or more of the devices of FIGS. 1-8 and 10 including end user devices, customer premises equipment, remote management servers, and/or secure download application function. In addition, the controller 1106 can communicate with the secure services platform to perform the functions 1060 or can perform functions 1062 or 1064.

Upon reviewing the aforementioned embodiments, it would be evident to an artisan with ordinary skill in the art that said embodiments can be modified, reduced, or enhanced without departing from the scope of the claims described below. For example, access to content and/or applications can be broken down into segments which require multiple verifications by the secure element 108 and SDP 106 as described with respect to method 900.

Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
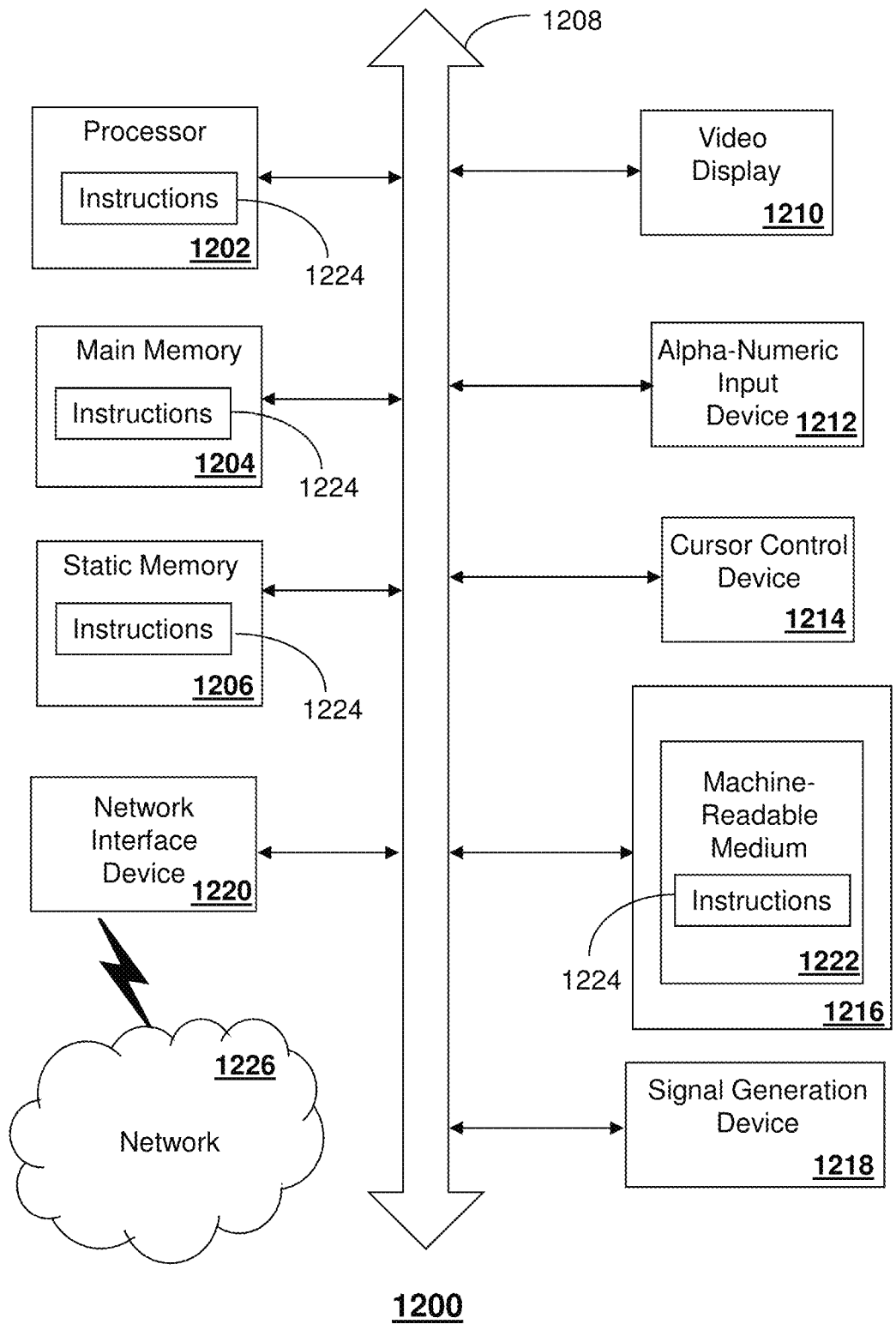
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine can operate, for example, as the remote management server, the secure download application function, the secure services platform, and so forth. In some embodiments, the machine may be connected (e.g., using a network 1226) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU), a graphics processing unit (GPU, or both), a main memory 1204 and a static memory 1206, which communicate with each other via a bus 1208. The computer system 1200 may further include a display unit 1210 (e.g., a liquid crystal display (LCD)), a flat panel, or a solid state display. The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "separate" can include a component or device that is logically and/or physically separate from another component or device, which can include components/devices that operate independently of each other while being in communication with each other. In one or more embodiments, devices can be separate in that they do not share any common component (although such separate devices can be in communication with each other such as via an electrode coupling. In one or more embodiments, devices can be separate in that they each have one or more components that are not shared between each other but have one or more components that may be shared with each other.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP, NFC) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee, NFC), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more steps or functions, where the facilitating (e.g., facilitating access or facilitating establishing a connection) can include less than all of the steps needed to perform the function or can include all of the steps of the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
a secure element having a secure element memory; and
a secure device processor having a secure device processor memory with executable instructions, wherein the secure device processor is separate from the secure element and in communication with the secure element, wherein the secure device processor, responsive to executing the executable instructions, facilitates performance of operations, the operations comprising:
receiving a first verification which is generated by the secure element based on secret information that is stored in the secure element memory without the secure element providing the secret information to the secure device processor, wherein the secure device processor does not have access to the secret information and wherein the first verification is associated with access to content that is sourced via a source server;
generating a second verification for the access to the content based on non-secret information, wherein the content is accessed from the source server based on the first verification and the second verification;
generating consumption information by monitoring the access to the content;
providing the consumption information associated with the access to the content to the secure element, the consumption information indicating that the content has been presented by the communication device;
receiving access instructions from the secure element responsive to the consumption information; and
preventing the communication device from further accessing the content according to the access instructions.

2. The communication device of claim 1, wherein the operations further comprise:

receiving user input requesting content browsing access, wherein the user input includes user credentials;

providing the user credentials to the secure element;

receiving browsing access credentials from the secure element responsive to an authentication of the user credentials by the secure element; and facilitating establishing a browsing channel responsive to the browsing access credentials, wherein the browsing channel enables browsing a group of content.

3. The communication device of claim 2, wherein the browsing channel is established between the communication device and a secure download application function and wherein the browsing channel enables browsing the group of content via the secure download application function.

4. The communication device of claim 1, wherein:

the secret information and the non-secret information are obtained by the secure element from a remote management server;

the secret information comprises an authentication credential; and the non-secret information comprises a distribution rule associated with digital rights management for the content.

5. The communication device of claim 1, wherein the content is received from a secure download application function responsive to the first verification and the second verification, wherein the secure element comprises a universal integrated circuit card, wherein the secret information and the non-secret information are obtained by the secure element from the secure download application function via a remote management server, wherein a download path of the content from the secure download application function does not include the remote management server, and wherein the remote management server is remote from the communication device and the secure download application function.

6. The communication device of claim 1, further comprising a device processor that is separate from the secure element and the secure device processor;

wherein the device processor facilitates wireless communications between the communication device and the source server;

wherein the operations further comprise receiving from the secure element the non-secret information that is stored in the secure element memory; and wherein the content is accessed from the source server by the device processor based on the first verification and the second verification.

7. The communication device of claim 1, wherein the secret information includes a decryption key for content presentation and an authentication credential, and wherein the non-secret information includes a user identification, a device identification, digital rights management data, and a validity time period.

8. The communication device of claim 1, wherein the secret information and the non-secret information are obtained by the secure element via a remote management server, and wherein keysets are utilized for mutual authentication of the secure element and the secure device processor with the remote management server.

9. The communication device of claim 1, wherein the content is stored at the communication device, and wherein the operations further comprise:

receiving update information from a secure download application function via a remote management server, wherein the update information is received prior to the content having been presented by the communication device; and adjusting the secret information and the non-secret information based on the update information.

10. The communication device of claim 1, wherein the operations further comprise providing a request for the first verification to the secure element.

11. A method, comprising:

receiving, by a secure device processor of a communication device, a first verification which is generated by a secure element of the communication device, wherein the first verification is generated by the secure element based on secret information that is stored in a secure element memory of the secure element, wherein the first verification is generated by the secure element without the secure element providing the secret information to the secure device processor, wherein the secure device processor does not have access to the secret information, wherein the secure device processor is separate from the secure element and is in communication with the secure element, and wherein the first verification is associated with access to an application that is sourced via a secure download application function;

generating, by the secure device processor, a second verification for the access to the application based on non-secret information, wherein the application is accessed by the communication device responsive to the first verification and the second verification;

generating, by the secure device processor, consumption information by monitoring the access to the application;

providing, by the secure device processor, the consumption information associated with the access to the application to the secure download application function, the consumption information indicating that the application has been executed by the communication device;

receiving, by the secure device processor, access instructions from the secure download application function responsive to the consumption information;

preventing, by the secure device processor, the communication device from further accessing the application according to the access instructions; and facilitating establishing a browsing channel between the communication device and the secure download application function responsive to browsing access credentials, wherein the browsing channel enables browsing a group of applications accessible via the secure download application function.

12. The method of claim 11, further comprising:

providing, by the secure device processor, a request for the first verification to the secure element; and receiving, by the secure device processor, the non-secret information, wherein the non-secret information is stored in the secure element memory of the secure element, and wherein the non-secret information is received by the secure device processor from the secure element;

wherein a device processor of the communication device facilitates wireless communications for the communication device, and wherein the device processor is separate from the secure element and the secure device processor.

13. The method of claim 11, further comprising:
receiving, by the communication device, user input requesting browsing access, wherein the user input includes user credentials;
providing, within the communication device, the user credentials to the secure element; and
receiving, within the communication device, the browsing access credentials from the secure element responsive to an authentication of the user credentials by the secure element.

14. The method of claim 11, wherein the secret information and the non-secret information are obtained by the secure element via a remote management server, wherein keysets are utilized for mutual authentication of the secure element and the secure device processor with the remote management server and wherein the method further comprises:
receiving, within the communication device, update information from the secure download application function via the remote management server; and
adjusting, within the communication device, the secret information and the non-secret information based on the update information.

15. The method of claim 11, further comprising facilitating, by a device processor of the communication device, wireless communications between the communication device and the secure download application function, wherein the device processor is in communication with the secure device processor, wherein the secret information includes a decryption key for application execution and an authentication credential, wherein the non-secret information includes a user identification, a device identification, digital rights management data, and a validity time period, and wherein the application is stored in a storage device of the communication device.

16. The method of claim 11, further comprising:
requesting, by the secure device processor, a decryption key from the secure element;
receiving, by the secure device processor, the decryption key;
performing, by the secure device processor, a decryption of the application using the decryption key; and
enabling, by the secure device processor, execution of the application at the communication device responsive to the decryption.

17. A method, comprising:
storing by a communication device, which comprises a secure element having a secure element memory and a secure device processor, secret information, wherein the secret information is stored by the communication device in the secure element memory, wherein the secret information is stored after being received from a secure download application function, wherein the secure download application function is remote from the communication device, and wherein the secure device processor is separate from the secure element;
generating, within the communication device, a first verification by the secure element, wherein the first verification is associated with access to content that is sourced via the secure download application function, wherein the first verification is based on the secret information without the secure element providing the secret information to the secure device processor, and wherein the secure device processor does not have access to the secret information;
generating, within the communication device, a second verification for the access to the content based on non-secret information;
generating, within the communication device, consumption information by monitoring the access to the content;
providing, by the communication device, the consumption information associated with the access to the content to the secure download application function, the consumption information indicating that the content has been presented by the communication device;
receiving by the communication device, responsive to the consumption information, access instructions from the secure download application function; and
preventing, within the communication device, further access to the content according to the access instructions;
wherein the content includes file permissions, and wherein the content having been presented by the communication device is according to the file permissions.

18. The method of claim 17, further comprising:
storing, by the communication device, the non-secret information, wherein the non-secret information is stored by the communication device in the secure element memory, and wherein the secret information and the non-secret information are stored after being received from the secure download application function; and
obtaining, within the communication device, the non-secret information from the secure element;
wherein the communication device includes a device processor that is separate from the secure element and the secure device processor.

19. The method of claim 17, wherein the secret information includes a decryption key for content presentation, wherein the non-secret information includes device permissions, and wherein the content having been presented by the communication device is according to the device permissions.

20. The method of claim 17, wherein the secret information comprises an authentication credential and wherein the non-secret information comprises a distribution rule associated with digital rights management for the content.

* * * * *